United States Patent
Trice et al.

(10) Patent No.: US 9,216,535 B2
(45) Date of Patent: Dec. 22, 2015

(54) SLOT DIE POSITION ADJUSTMENTS TO FACILITATE PATTERNED PRODUCTS

(75) Inventors: Jennifer L. Trice, Hugo, MN (US);
Pentti K. Loukusa, Hanover, MN (US);
Robert A. Yapel, Oakdale, MN (US);
Robert B. Secor, Stillwater, MN (US);
Paul C. Thomas, Roberts, WI (US);
William J. Kopecky, Hudson, WI (US);
Keith R. Bruesewitz, River Falls, WI (US); Kristopher K. Biegler,
Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 438 days.

(21) Appl. No.: 13/155,357

(22) Filed: Jun. 7, 2011

(65) Prior Publication Data

US 2012/0313275 A1 Dec. 13, 2012

(51) Int. Cl.
| | |
|---|---|
| *B29C 47/92* | (2006.01) |
| *B29C 47/16* | (2006.01) |
| *B05C 5/02* | (2006.01) |
| *B05C 11/10* | (2006.01) |
| *B29C 47/00* | (2006.01) |
| *B29C 47/14* | (2006.01) |

(52) U.S. Cl.
CPC ............... *B29C 47/16* (2013.01); *B05C 5/0262* (2013.01); *B05C 11/1005* (2013.01); *B29C 47/92* (2013.01); *B29C 47/0021* (2013.01); *B29C 47/145* (2013.01); *B29C 2947/92152* (2013.01); *B29C 2947/92447* (2013.01); *B29C 2947/92647* (2013.01); *B29C 2947/92904* (2013.01)

(58) Field of Classification Search
USPC ................................................ 264/40.1, 167
See application file for complete search history.

(56) References Cited

U.S. PATENT DOCUMENTS

| | | | |
|---|---|---|---|
| 2,387,718 A | 11/1942 | Coleman | |
| 2,938,231 A | 10/1958 | Lowey, Jr. | |
| 3,122,781 A | 3/1964 | Mutter | |
| 3,464,087 A | 9/1969 | Koch | |

(Continued)

FOREIGN PATENT DOCUMENTS

| | | |
|---|---|---|
| DE | 2 631 099 | 1/1978 |
| DE | 1 002 0202 | 10/2001 |

(Continued)

OTHER PUBLICATIONS

Extrusion Dies for Plastics and Rubber Design and Engineering Computations, 3rd Revised Edition, Walter Michaeli, Hanser-Gardner Publications, Cincinnati 2003 ISBN 1-56990-349-2, Chapters 9 & 11, 52 pp.

(Continued)

*Primary Examiner* — Christina Johnson
*Assistant Examiner* — Xue Liu
(74) *Attorney, Agent, or Firm* — Yufeng Dong; Steven Skolnick; Melissa Buss

(57) ABSTRACT

A method of controlling a slot die comprises positioning actuators of the slot die with a controller according to a first set of discrete settings, operating the slot die by passing an extrudate through the fluid flow path and out the applicator slot with the actuators positioned according to the first set of discrete settings, and while passing the extrudate through the fluid flow path and out the applicator slot, changing the positions of the actuators with the controller to create patterned features in the extrudate.

13 Claims, 13 Drawing Sheets

(56) References Cited

U.S. PATENT DOCUMENTS

| | | | |
|---|---|---|---|
| 3,813,204 A | 5/1974 | Gregory | |
| 3,819,775 A | 6/1974 | Mules | |
| 3,836,313 A | 9/1974 | Stafford | |
| 3,877,857 A | 4/1975 | Melead | |
| 3,884,611 A | 5/1975 | Anderson et al. | |
| 3,940,221 A | 2/1976 | Nissel | |
| 4,439,125 A | 3/1984 | Dieckmann et al. | |
| 4,445,837 A | 5/1984 | Cisar | |
| 4,514,347 A | 4/1985 | Reed | |
| 4,594,063 A | 6/1986 | Reifenhäuser | |
| 4,731,004 A | 3/1988 | Wenz | |
| 4,732,776 A | 3/1988 | Boissevain | |
| 4,741,686 A | 5/1988 | Cazzani | |
| 4,871,493 A | 10/1989 | Goto | |
| 4,990,079 A | 2/1991 | Lorenz | |
| 5,253,992 A | 10/1993 | Reifenhäuser | |
| 5,397,514 A | 3/1995 | Breil | |
| 5,464,577 A | 11/1995 | Leonard | |
| 5,489,402 A * | 2/1996 | Knoblauch et al. | 264/407 |
| 5,587,184 A | 12/1996 | Leonard | |
| 5,626,888 A | 5/1997 | Sänze | |
| 5,770,129 A | 6/1998 | Monti | |
| 5,770,240 A | 6/1998 | Krupa | |
| 5,814,258 A | 9/1998 | Ogawa | |
| 6,039,904 A * | 3/2000 | Nitta et al. | 264/40.5 |
| 6,106,671 A | 8/2000 | Heaven | |
| 6,109,592 A | 8/2000 | Lippert | |
| 6,139,635 A | 10/2000 | Mononen | |
| 6,206,680 B1 | 3/2001 | Ulcej | |
| 6,352,424 B1 | 3/2002 | Ulcej | |
| 6,447,875 B1 | 9/2002 | Norquist | |
| 7,056,112 B2 | 6/2006 | Ulcej | |
| 7,160,094 B2 | 1/2007 | Wyatt | |
| 2002/0098256 A1* | 7/2002 | Polk, Jr. | 425/258 |
| 2004/0150126 A1* | 8/2004 | Ide et al. | 264/46.1 |
| 2005/0008782 A1* | 1/2005 | Nelson et al. | 427/356 |
| 2008/0274223 A1 | 11/2008 | Cloeren | |
| 2009/0035410 A1* | 2/2009 | Mizunuma et al. | 425/170 |
| 2010/0168894 A1 | 7/2010 | Yapel | |
| 2010/0285187 A1* | 11/2010 | Weinstein et al. | 426/238 |

FOREIGN PATENT DOCUMENTS

| | | |
|---|---|---|
| EP | 0 767 044 | 4/1997 |
| GB | 1 220 507 | 1/1971 |
| JP | 61-002522 | 1/1986 |

OTHER PUBLICATIONS

Stephan F. Kistler, Peter M. Schweizer, Liquid Film Coating Scientific Principles and their Technological Implications, Chapman & Hall, New York, 1997 ISBN 0-412-06841-2 Chapters 10 & 11, 57 pp.

Stanley Middleman, Fundamentals of Polymer Processing, McGraw-Hill, New York, 1977, Chapters 8.1 and 8.2, ISBN 0-07-041851-9, 25 pp.

Edward D. Cohen, Edgar B. Gutoff, Modern Coating and Drying Technology, , VCH Publishers, New York, 1992, Chapters 3.3, 3.7, 3.8, 4.1, ISBN 1-56081-097-1, 26 pp.

Edgar B. Gutoff, Edward D. Cohen, Coating and Drying Defects Troubleshooting Operating Problems, 2nd Edition, John Wiley & Sons, 2006, Chapter 7, ISBN 978-0-471-71368-5, 15 pp.

U.S. Appl. No. 13/155,272, entitled, "Slot Die Position Control," filed Jun. 7, 2011.

U.S. Appl. No. 13/155,349, entitled "Slot Die Position Adjustment and Return to Baseline," filed Jun. 7, 2011.

U.S. Appl. No. 61/494,385, entitled "Techniques for Providing Die Lip Flatness," filed Jun. 7, 2011.

U.S. Appl. No. 61/494,393, entitled, "Die Lip Profile Control," filed Jun. 7, 2011.

\* cited by examiner

SLOT DIE POSITION ADJUSTMENTS TO FACILITATE PATTERNED PRODUCTS

TECHNICAL FIELD

The invention relates to slot dies.

BACKGROUND

Generally, slot dies includes die lips that form an applicator slot. The width of the applicator slot can extend about the width of a moving web or the width of a roller that receives the extruded product, such as a film. As used herein, with respect to slot dies and components of slot dies, "a width" refers to the cross-web (or cross-roller) dimension of a slot die and its components. In this regard, an applicator slot of a slot die extends about the width of the slot die.

Slot dies are commonly used to form extrusions and coatings. As an example, slot dies are used in slot die coatings to apply a liquid material to a moving flexible substrate or "web." There are many variations in techniques for slot die coatings. As one example, coating materials can be at room temperature or a controlled temperature. When a coating material temperature is elevated to ensure that the coating material is melted or liquefied for processing, this is often referred to as "hot melt" coating. In other examples, a coating material can include solvent diluents. Solvents can be water, organic solvents, or any suitable fluid that dissolves or disperses components of a coating. Solvents are typically removed in subsequent processing such as by drying. A coating can include single or multiple layers, and some slot dies may be used to apply multiple layers simultaneously. A coating can be a continuous coating across the width of the die or instead include form strips, each strip extending across only a portion of the width of the die and being separated from adjacent strips.

Slot dies are also used to form extrusions, including thin-film extrusions or other extrusions. In some examples, extrusions can be extrusion coatings and applied to a web substrate, a process which may be referred to as extrusion coating. In other examples, the extruded material forms a film or web directly. An extruded film might be subsequently processed by length orienting or tentering operations. As with coating, the extrudate might comprise a single layer or multiple layers.

The thickness of an extruded product, such as a film or coating, is dependent upon, among other factors, the flow rate of the extrudate through the slot die. In one example, a slot die can include an adjustable choker bar within the flow path that can be used to locally adjust the flow rate of the extrudate through the slot die to provide a desired thickness profile. A slot die can also include a flexible die lip that can be used to locally adjust the thickness of the applicator slot itself to control the flow rate of the extrudate from the applicator slot to provide a desired thickness profile.

A slot die may include a plurality of actuators spaced about the width of the applicator slot in order to provide a desired thickness profile for an extruded product. For example, each actuator can be configured to provide a local positional adjustment of a choker bar or flexible die lip.

After starting an extrusion process using a slot die, the cross-web profile of an extrudate can be measured. Each actuator may then need to be individually adjusted to provide a desired thickness profile, such as a consistent thickness, for the extruded product across the width of the applicator slot.

SUMMARY

In general, this disclosure is directed to techniques for creating patterned features in extruded products by varying the thickness of the fluid flow path through the die and may include, e.g., varying the thickness of the fluid flow path substantially continuously, periodically, and/or randomly. In different examples, a die may include a choker bar or a flexible die lip and a plurality of actuators operable to control the position choker bar or a flexible die lip spaced about a width of the die choker bar or a flexible die lip. Varying the thickness of the fluid flow path through the die may include sending digital instructions to the actuators to change the position of the choker bar or a flexible die lip.

In one example, a method of controlling a slot die is disclosed. The slot die includes an applicator slot extending about a width of the slot die, wherein the applicator slot is in fluid communication with a fluid flow path through the slot die, and a plurality of actuators spaced about the width of the slot die. Each actuator in the plurality of actuators is operable to adjust a cross-directional thickness of the fluid flow path at its respective location to provide a local adjustment of fluid flow through the applicator slot. The method comprises, with a controller in communication with each actuator, wherein the controller is configured to set the position of each actuator according to one of a plurality of discrete settings, positioning each of the actuators according to a first set of discrete settings selected from the plurality of discrete settings, operating the slot die by passing an extrudate through the fluid flow path and out the applicator slot with the actuators positioned according to the first set of discrete settings, and, while passing the extrudate through the fluid flow path and out the applicator slot, changing the positions of the actuators with the controller to create patterned features in the extrudate.

In a further example, a method of controlling a slot die is disclosed. The slot die includes an applicator slot extending about a width of the slot die, wherein the applicator slot is in fluid communication with a fluid flow path through the slot die, and a plurality of actuators spaced about the width of the slot die. Each actuator in the plurality of actuators is operable to adjust a cross-directional thickness of the fluid flow path at its respective location to provide a local adjustment of fluid flow through the applicator slot. The method comprises, with a controller in communication with each actuator, wherein the controller is configured to set the position of each actuator according to one of a plurality of discrete settings, positioning each of the actuators according to a first set of discrete settings selected from the plurality of discrete settings, operating the slot die by passing an extrudate through the fluid flow path and out the applicator slot with the actuators positioned according to the first set of discrete settings to create a strip coating, and while passing the extrudate through the fluid flow path and out the applicator slot, changing the positions of the actuators with the controller to create strips having varying widths In another example, a method of controlling a slot die is disclosed. The slot die includes an applicator slot extending about a width of the slot die, wherein the applicator slot is in fluid communication with a fluid flow path through the slot die, and a plurality of actuators spaced about the width of the slot die. Each actuator in the plurality of actuators is operable to adjust a cross-directional thickness of the fluid flow path at its respective location to provide a local adjustment of fluid flow through the applicator slot. The method comprises, with a controller in communication with each actuator, wherein the controller is configured to set the position of each actuator according to one of a plurality of discrete settings, using fluid dynamics and a digital model of the die to predict a set of discrete settings from the plurality of discrete settings corresponding to a preselected strip width, positioning each of the actuators with the controller according to the predicted set of discrete settings, and operating the slot die by passing an extrudate through the fluid flow path and out the applicator slot with the actuators positioned according to the predicted set of discrete settings.

In a further example, a controller configured to control a slot die is disclosed. The slot die includes an applicator slot extending about a width of the slot die, wherein the applicator slot is in fluid communication with a fluid flow path through the slot die, and a plurality of actuators spaced about the width of the slot die. Each actuator in the plurality of actuators is operable to adjust a cross-directional thickness of the fluid flow path at its respective location to provide a local adjustment of fluid flow through the applicator slot. The controller is configured to set the position of each actuator according to a first set of discrete settings selected from one of a plurality of discrete settings. The controller is further configured to change the positions of the actuators to create patterned features in the extrudate while passing the extrudate through the fluid flow path and out the applicator slot.

In another example, a system comprises a slot die. The slot die includes: an applicator slot extending about a width of the slot die, wherein the applicator slot is in fluid communication with a fluid flow path through the slot die, and a plurality of actuators spaced about the width of the slot die. Each actuator in the plurality of actuators is operable to adjust a cross-directional thickness of the fluid flow path at its respective location to provide a local adjustment of fluid flow through the applicator slot. The system further comprises a controller in communication with each actuator. The controller is configured to set the position of each actuator according to a first set of discrete settings selected from one of a plurality of discrete settings. The controller is further configured to change the positions of the actuators to create patterned features in the extrudate while passing the extrudate through the fluid flow path and out the applicator slot.

The details of one or more examples of this disclosure are set forth in the accompanying drawings and the description below. Other features, objects, and advantages of this disclosure will be apparent from the description and drawings, and from the claims.

DETAILED DESCRIPTION

Figure 1A:
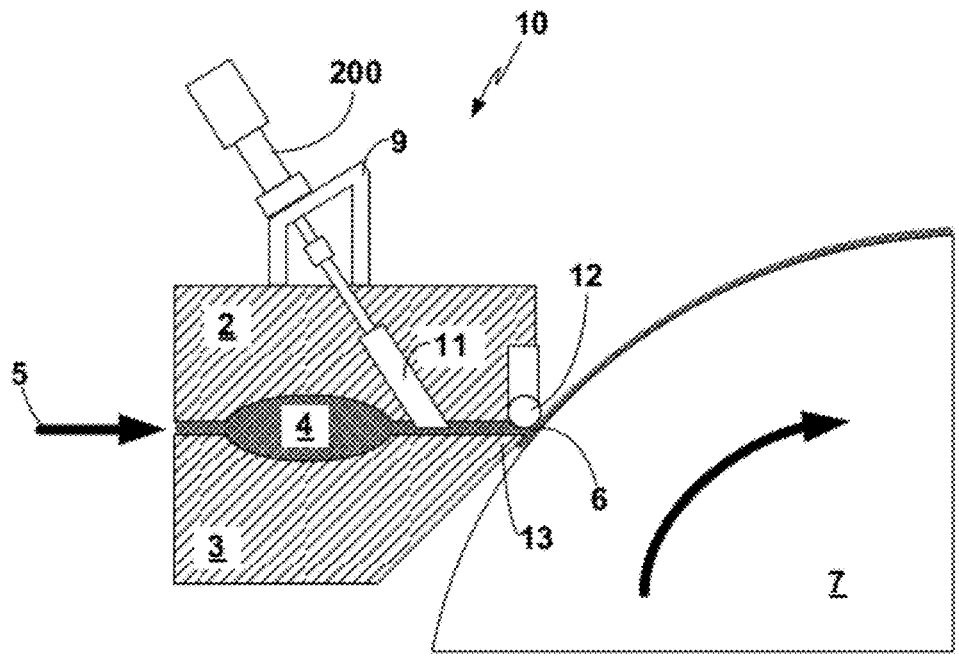
FIGS. 1A-1B illustrate a slot die including a choker bar with a plurality of actuators, each actuator operable to adjust a cross-directional thickness of the fluid flow path at its location.
Figure 1B:
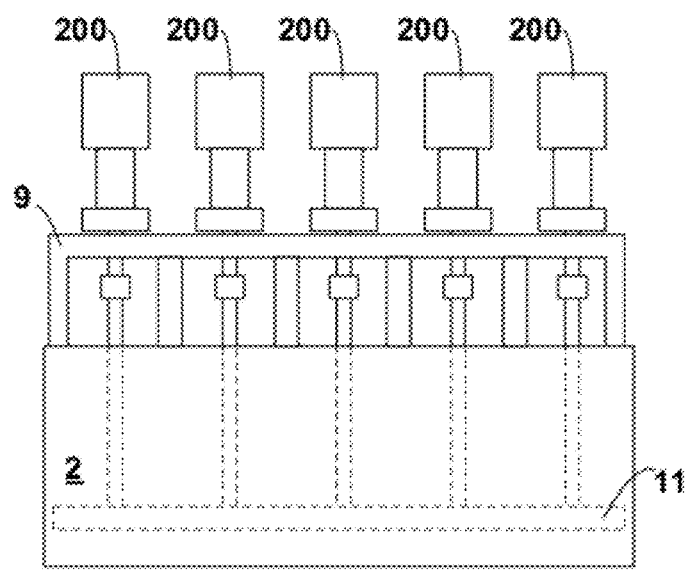

FIGS. 1A-1B illustrate slot die 10. Slot die 10 includes an upper die block 2 and a lower die block 3. Upper die block 2 combines with lower die block 3 to form a fluid flow path through slot die 10. The fluid flow path includes entry 5, die cavity 4 and applicator slot 6. Applicator slot 6 is between rotary rod 12, which is mounted to upper die block 2, and die lip 13 of lower die block 3. Because slot die 10 includes rotary rod 12 at its applicator slot, slot die 10 may be referred to as a rotary rod die.

Slot die 10 includes a choker bar 11 that extends across the width of the fluid flow path within slot die 10. As one example, the width of the fluid flow path within slot die 10 at choker bar 11 may be approximately the same as the width of applicator slot 6 such that choker bar 11 extends about the width of applicator slot 6. Actuator assemblies 200 are mounted on a common mounting bracket 9 and spaced about the width of slot die 10. In some example, mounting bracket 9 may be segmented, e.g., mounting bracket 9 may include separate structures for each actuator assembly 200. Each actuator assembly 200 is operable to adjust a cross-directional thickness of the fluid flow path at its respective location about the width of slot die 10 to provide a local adjustment of fluid flow through applicator slot 6 by changing the position of choker bar 11 within the fluid flow path of the extrudate within die 10.

During operation of slot die 10, an extrudate enters slot die 10 at fluid flow path entry 5 and continues through the fluid flow path of slot die 10, including die cavity 4 until the extrudate exits through applicator slot 6 and is applied to moving roller 7. In some examples, the extruded product may be applied to a moving web (not shown), in other examples, the extruded product may be applied directly to roller 7. The extruded product and web (if applicable) may be run over a series of rollers to allow the extruded product to cool. One or more additional processes may be performed to the extruded product downstream of roller 7. While not germane to this disclosure, such processes include, but are not limited to, stretching, coating, texturing, printing, cutting, rolling, etc.

As best shown in FIG. 1B, slot 10 includes a set of five actuator assemblies 200 mounted on a common mounting bracket 9. Each actuator assembly 200 is attached to choker bar 11 and actuator assemblies 200 are spaced about a width of choker bar 11. Each of the actuators is operable to control the thickness of the fluid flow path at its location by providing a local adjustment of the position of choker bar 11 within the fluid flow path within slot die 10.

Figure 4:
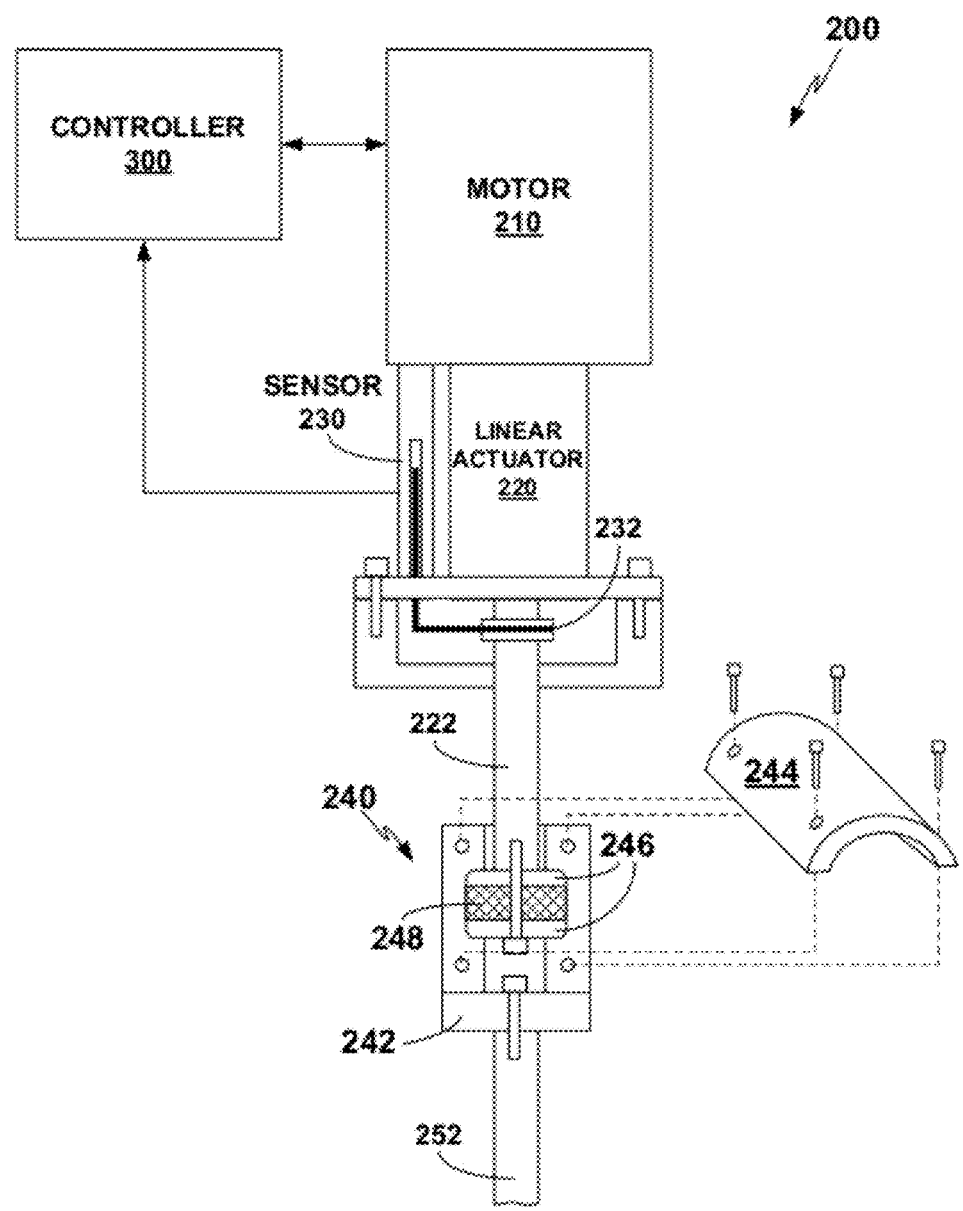
FIG. 4 illustrates an actuator assembly including a position sensor and a controller for selecting the position of the actuator assembly based on the output of the position sensor.

As discussed in further detail with respect to FIG. 4, each of actuator assemblies 200 includes a motor that drives a linear actuator. Each of actuator assemblies 200 also includes a precision sensor, such as a linear variable differential transformer (LVDT) or a linear encoder, that detects position movements of the output shaft of the linear actuator. The output shafts of linear actuator assemblies 200 are spaced about the width of choker bar 11 such that each linear actuator assembly 200 is operable to adjust the local position of the choker bar. As discussed in further detail below, the positions of each linear actuator are individually selectable to provide a desired cross-web profile of an extruded product. In addition, the positions of linear actuator assemblies 200 can be precisely coordinated to provide a desired die cavity pressure within die cavity 4 during the operation of slot die 10 by adjusting the overall cross-sectional area of the fluid flow path adjacent choker bar 11 within slot die 10. In other examples, the positions of each actuator assembly 200 may be actively controlled to create an extruded product with patterned features, such as repeating or random patterned features. As referred to herein, references to the position of an actuator or actuator assembly are intended to more specifically refer to the relative positioning of the actuator output shaft.

Figure 2:
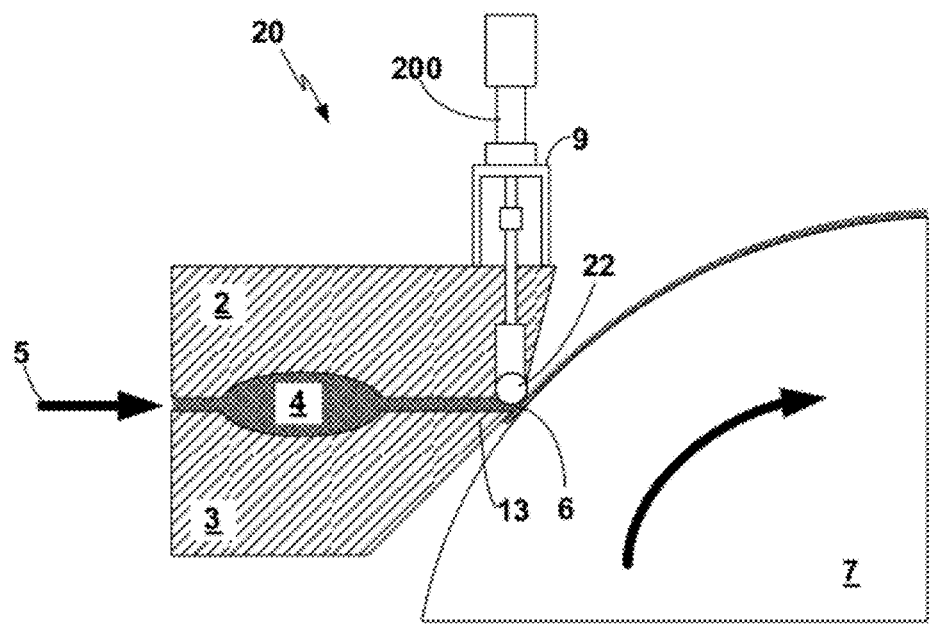
FIG. 2 illustrates a slot die including an adjustable rotary rod with a plurality of actuators connected to the rotary rod, each actuator operable to adjust the local position of the rotary rod at its location and thereby adjust the local thickness of the applicator slot.

FIG. 2 illustrates slot die 20. Slot die 20 includes adjustable rotary rod 22 with a plurality of actuator assemblies 200 connected to rotary rod 22. Each actuator assembly 200 is operable to adjust the local position of rotary rod 22 at its location and thereby adjust the local thickness of applicator slot 6. Some aspects of slot die 20 are similar to those of slot die 10 and are discussed in limited detail with respect to slot die 20. Components of slot die 20 that have the same reference numeral as components in slot die 10 are substantially similar to the like-numbered components of slot die 10.

Slot die 20 includes an upper die block 2 and a lower die block 3. Upper die block 2 combines with lower die block 3 to form a fluid flow path through slot die 20. The fluid flow path includes entry 5, die cavity 4 and applicator slot 6. Applicator slot 6 is between adjustable rotary rod 22, which is mounted to upper die block 2 and die lip 13 of lower die block 3. Because slot die 20 includes adjustable rotary rod 22 at its applicator slot, slot die 20 may be referred to as a rotary rod die.

Slot die 20 differs from slot die 10 in that the thickness of applicator slot 6 is controlled by actuator assemblies 200, which connect to rotary rod 22. Actuator assemblies 200 are mounted on a common mounting bracket 9 and spaced about the width of slot die 20. Each actuator assembly 200 is operable to adjust a cross-directional thickness of the fluid flow path at its respective location about the width of slot die 20 to provide a local adjustment of fluid flow through applicator slot 6 by changing the position of rotary rod 22. While only one actuator assembly 200 is shown in FIG. 2, slot die 20 includes a set of actuator assemblies 200 spaced about the width of rotary rod 22 and slot die 20 and, similar to the arrangement of actuator assemblies 200 as shown in FIG. 1B.

During operation of slot die 20, an extrudate enters slot die 20 at fluid flow path entry 5 and continues through the fluid flow path of slot die 20, including die cavity 4, until the extrudate exits through applicator slot 6 and is applied to moving roller 7. In some examples, the extruded product may be applied to a moving web (not shown), in other examples, the extruded product may be applied directly to roller 7. The extruded product and web (if applicable) may be run over a series of rollers to allow the extruded product to cool. One or more additional processes may be performed to the extruded product downstream of roller 7, such processes include, but are not limited to, stretching, coating, texturing, printing, cutting, rolling, etc.

Each of actuator assemblies 200 is operable to control the thickness of the fluid flow path at its location by providing a local adjustment of the position of rotary rod 22. As discussed in further detail below, the positions of each actuator assembly 200 are individually selectable to provide a desired cross-web profile of an extruded product. In addition, the positions of linear actuator assemblies 200 can be precisely coordinated to provide a desired die cavity pressure within die cavity 4 during the operation of slot die 20 by adjusting the overall cross-sectional area of applicator slot 6. In other examples, the positions of each actuator assembly 200 may be actively controlled to create an extruded product with patterned features, such as repeating or random patterned features.

While slot die 20 does not include a choker bar, in other examples, a slot die with an adjustable rotary rod may also include an adjustable choker bar, like choker bar 11 of slot die 10. The position of such a choker bar may be locally controlled by a set of actuators, just as with choker bar 11 of slot die 10.

Figure 3:
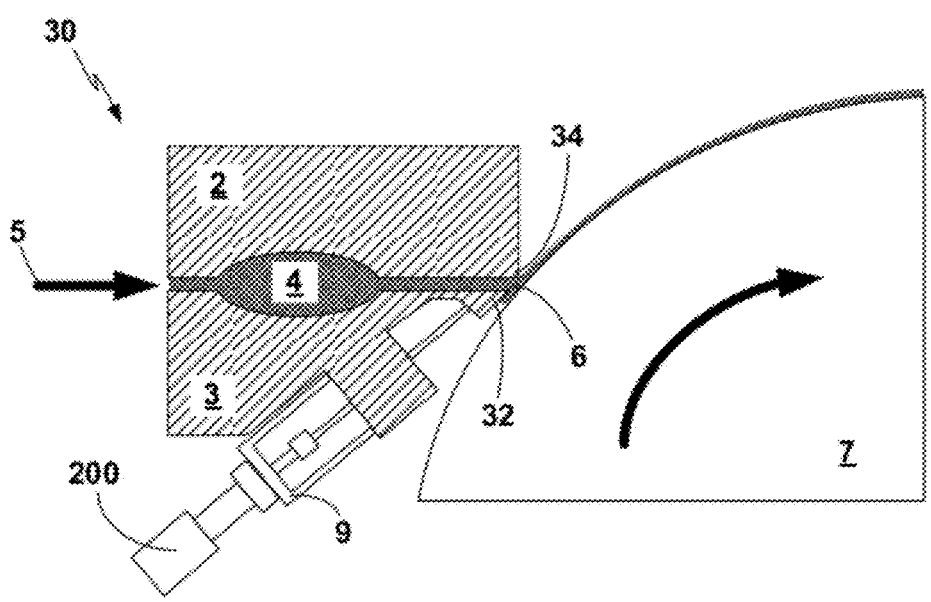
FIG. 3 illustrates a slot die including a flexible die lip with a plurality of actuators connected to the flexible die lip, each actuator operable to adjust the local position of the flexible die lip at its location and thereby adjust the local thickness of the applicator slot.

FIG. 3 illustrates slot die 30. Slot die 30 includes flexible die lip 32 with a plurality of actuator assemblies 200 connected to flexible die lip 32. Each actuator assembly 200 is operable to adjust the local position of flexible die lip 32 at its location and thereby adjust the local thickness of applicator slot 6. Some aspects of slot die 30 are similar to those of slot die 10 and slot die 20 and are discussed in limited detail with respect to slot die 30. Components of slot die 30 that have the same reference numeral as components in slot die 10 and slot die 20 are substantially similar to the like-numbered components of slot die 10 and slot die 20.

Slot die 30 includes an upper die block 2 and a lower die block 3. Upper die block 2 combines with lower die block 3 to form a fluid flow path through slot die 30. The fluid flow path includes entry 5, die cavity 4 and applicator slot 6. Applicator slot 6 is between die lip 34, which is part of upper die block 2, and flexible die lip 32 of lower die block 3.

Slot die 30 differs from slot die 10 in that the thickness of applicator slot 6 is controlled by actuator assemblies 200, which connect to flexible die lip 32. Actuator assemblies 200 are mounted on a common mounting bracket 9 and spaced about the width of slot die 30. Each actuator 200 is operable to adjust a cross-directional thickness of the fluid flow path at its respective location about the width of slot die 30 to provide a local adjustment of fluid flow through applicator slot 6 by changing the position of flexible die lip 32. While only one actuator 300 is shown in FIG. 3, slot die 30 includes a set of actuator assemblies 200 spaced about the width of flexible die lip 32 and slot die 30 and, similar to the arrangement of actuator assemblies 200 as shown in FIG. 1B.

During operation of slot die 30, an extrudate enters slot die 30 under pressure at fluid flow path entry 5 and continues through the fluid flow path of slot die 30, including die cavity 4, until the extrudate exits through applicator slot 6 and is applied to moving roller 7. In some examples, the extruded product may be applied to a moving web (not shown), in other examples, the extruded product may be applied directly to roller 7. The extruded product and web (if applicable) may be run over a series of rollers to allow the extruded product to cool.

In other examples, slot die 30 may be used with a different configuration of rollers. For example, the extrudate may form a curtain that drops onto a downstream roller, in this case referred to as a casting wheel, that can be temperature controlled. In other examples, an extrudate curtain may drop vertically or traverse horizontally (or any angle) into a nip of two rollers for subsequent processing. This is often used in both film extrusion and extrusion coating operations.

One or more additional processes may be performed to the extruded product downstream of roller 7; such processes include, but are not limited to, stretching, coating, texturing, printing, cutting, rolling, etc.

Each of actuator assemblies 200 is operable to control the thickness of the fluid flow path at its location by providing a local adjustment of the position of flexible die lip 32. As discussed in further detail below, the positions of each actuator assembly 200 are individually selectable to provide a desired cross-web profile of an extruded product. In addition, the positions of linear actuator assemblies 200 can be precisely coordinated to provide a desired die cavity pressure within die cavity 4 during the operation of slot die 30 by adjusting the overall cross-sectional area of applicator slot 6. In other examples, the positions of each actuator assembly 200 may be actively controlled to create an extruded product with patterned features, such as repeating or random patterned features.

While slot die 30 does not include a choker bar, in other examples, a slot die with a flexible die lip may also include an adjustable choker bar, like choker bar 11 of slot die 10. The position of such a choker bar may be locally controlled by a set of actuators, just as with choker bar 11 of slot die 10.

FIG. 4 illustrates an assembly including actuator assembly 200, zero-backlash coupler 240 and controller 300. As shown in FIGS. 1A-3, actuator assembly 200 may be used in a slot die to provide a local adjustment of a fluid flow path of the slot die, e.g., by adjusting the thickness of an applicator slot as with slot dies 20, 30 or by adjusting the thickness of a fluid flow path within the slot die as with slot die 10.

Actuator assembly 200 includes motor 210, linear actuator 220, which is coupled to motor 210, and position sensor 230. As one example, motor 210 may be a stepper motor. The output shaft (not shown) of motor 210 is mechanical coupled to linear actuator 220. Sensor 230 senses the position of linear actuator 220. For example, sensor 230 may be a LVDT sensor or a linear encoder. Sensor 230 is secured to output shaft 222 of linear actuator 220 with clamp 232 and precisely measures the relative position of output shaft 222 of linear actuator 220. In other examples, the sensor 230 might measure the output coupler 240, die actuator linkage 252, flexible die lip 32, rotary rod 22, or choker bar 11. As one example, actuator assemblies that are suitable for use as actuator assemblies 200 are available from Honeywell International Incorporated of Morristown, N.J.

Controller 300 receives position inputs from both motor 210 and sensor 230. For example, motor 210 may be a stepper motor and may provide an indication of the number of "steps" the stepper motor has taken from a known reference position of the stepper motor. Sensor 230 may provide more precise position information to controller 300 than that provided by the motor 210. Controller 300 provides instructions to motor 210 to drive output shaft 222 of actuator 220 to a preselected position. For example, controller 300 may monitor the position output shaft 222 of actuator 220 with sensor 230 while operating motor 210 in order to position output shaft 222 of actuator 220 according to a preselected position. In some examples, controller 300 may control a set of actuator assemblies 200, either simultaneously or sequentially. For example, controller 300 may control each of the actuator assemblies 200 in slot die 10, as shown in FIG. 1B.

In slot dies 10, 20, 30, output shaft 222 of actuator 220 is connected to die actuator linkage 252 by zero-backlash coupler 240. Zero backlash coupler 240 includes two halves that screw together: bottom half 242 and top half 244. Bottom half 242 is directly attached to die actuator linkage 252 with a screw. In addition, zero backlash coupler 240 includes a stacked protrusion assembly that bolts onto the end of output shaft 222 of actuator 220. The stacked protrusion assembly includes two metallic discs 246 surrounding an insulative disc 248. As one example, insulative disc 248 may comprise a ceramic material. Bottom half 242 and top half 244 combine to encircle the stacked protrusion assembly, including metallic discs 246 and insulative disc 248, bolted onto the end of output shaft 222 of actuator 220. Once top half 244 is securely screwed to bottom half 242, output shaft 222 of actuator 220 is effectively connected to zero-backlash coupler 240 and die actuator linkage 252.

Zero-backlash coupler 240 functions to thermally isolate actuator assembly 200 from the slot die. In particular, insulative disc 248 significantly limits the metal-to-metal contact path between output shaft 222 of actuator 220 and die actuator linkage 252. This helps protect actuator assembly 200 from damaging heat of a slot die. For example, slot dies commonly operate at temperatures in excess of three-hundred degrees Fahrenheit, whereas the components of actuator assembly 200, including motor 210 and sensor 230 may experience limited functionality or even permanent damage when subjected to temperatures to in excess of one-hundred-thirty degrees Fahrenheit. For this reason, zero-backlash coupler 240 may function to keep the temperature of actuator assembly 200 one-hundred-thirty degrees Fahrenheit or less. In some examples, discs 246 may also be formed from non-metallic materials such that there is no metal-to-metal contact between output shaft 222 of actuator 220 and die actuator linkage 252. Such examples further thermally isolate actuator assembly 200 from the slot die housing. In a further example, the surface area of the coupling 240 can be chosen to dissipate heat to keep the temperature of the actuator assembly 200 one-hundred-thirty degrees Fahrenheit or less. This might be use independently or in combination with the insulative disc 248. In further examples, active thermal control can be used cool to zero-backlash coupler 240, output shaft 222 or actuator assembly 200. Suitable examples of active thermal control include convective air flow, circulating liquid and thermo-electron devices.

In contrast to slot-die designs that utilize differential bolts as actuation mechanism, zero-backlash coupler 240 couples the output shaft 222 of actuator 220 to die actuator linkage 252 with limited or no backlash. Whereas as a differential bolt mechanism may have a backlash of more than one-hundred micrometers, zero-backlash coupler 240 may provide almost no backlash, such as less than ten micrometers, or even less than five micrometers, such as about three micrometers.

In a slot die utilizing a set of differential bolts to control applicator slot width or choker bar position, the relatively large backlash of each differential bolt means that adjusting the position of one differential bolt may change the thickness of the fluid flow path at other bolts. For this reason, the absolute position of the choker bar may never be known while operating the extrusion die. In contrast, in slot dies 10, 20, 30 the position of output shaft 222 of actuator 220 directly corresponds to the local position of choker bar 11 (for slot die 10), rotary rod 22 (for slot die 20) and flexible die lip 32 (for slot die 30). For this reason, slot dies 10, 20 and 30 facilitate repeatable, precise positioning not available in slot dies utilizing differential bolts as actuation mechanism.

Figure 5:
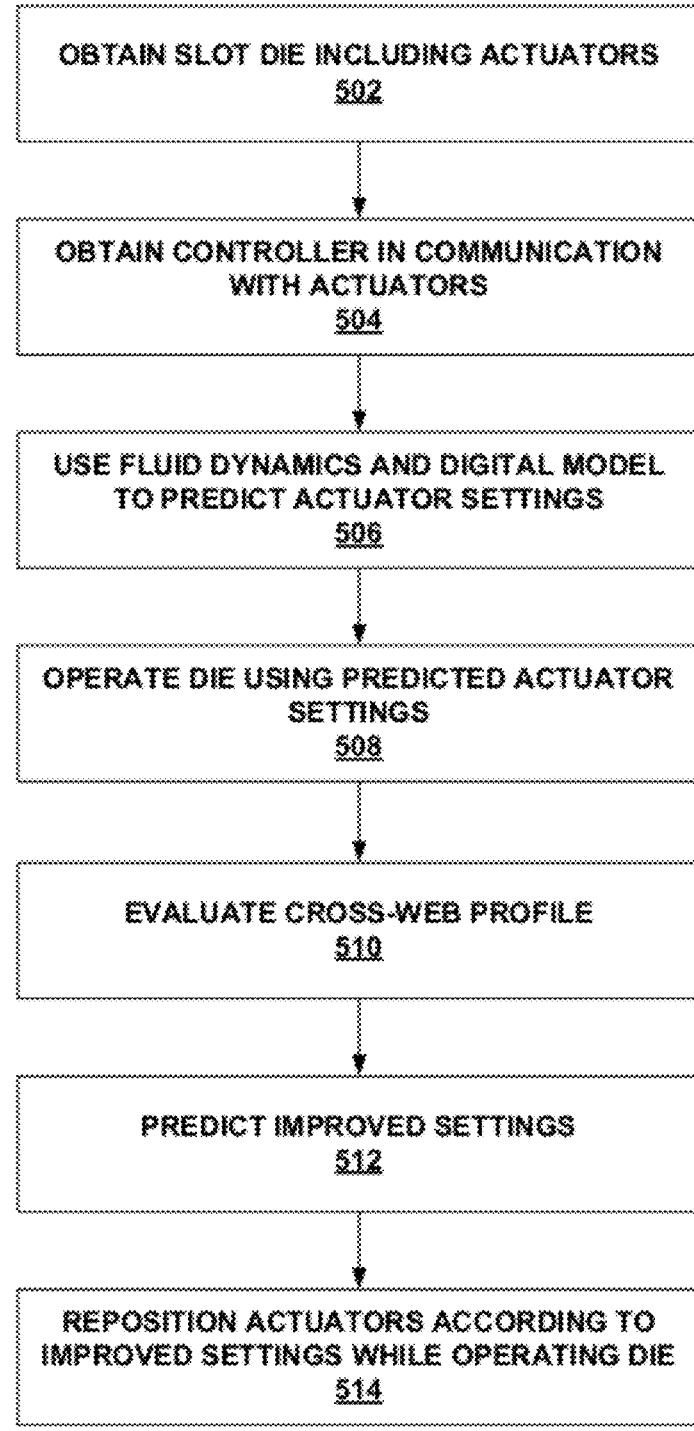
FIG. 5 is a flowchart illustrating techniques for selecting the position of each actuator in a plurality of actuators of a slot die according to a preselected cross-web profile of the extruded product.

FIG. 5 is a flowchart illustrating techniques for selecting the position of each actuator in a plurality of actuators of a slot die according to a preselected cross-web profile of the extruded product. While not limited to the slot dies disclosed herein, for clarity, the techniques of FIG. 5 are described with respect to slot die 10 (FIGS. 1A-1B), actuator assembly 200 (FIG. 4) and controller 300 (FIG. 4). In different examples, the techniques of FIG. 5 may be utilized for strip coating, a film slot die, a multi-layer slot die, a hot melt extrusion coating die, a drop die, a rotary rod die, an adhesive slot die, a solvent coating slot die, a water-based coating die, a slot fed knife die or other slot die.

First, a slot die, such as slot die 10, is obtained (502). The slot die includes an applicator slot extending about a width of the slot die and a plurality of actuators spaced about the width of the slot die. The applicator slot is in fluid communication with a fluid flow path through the slot die. Each actuator in the plurality of actuators is operable to adjust a cross-directional thickness of the fluid flow path at its respective location to provide a local adjustment of fluid flow through the applicator slot.

Next, a controller, such as controller 300, in communication with each actuator is obtained (504). The controller is configured to set the position of each actuator according to one of a plurality of discrete settings, such as measured position of sensor 230 and/or a stepper motor setting for motor 210.

Using fluid dynamics and a digital model of die 10, such as a solid model of die 10, controller 300 predicts a set of discrete settings from the plurality of discrete settings corresponding to a preselected cross-web profile (506). In different examples, controller 300 may retrieve the preselected cross-web profile from a non-transitory computer readable medium or may receive the preselected cross-web profile from a user input.

In different examples, the predicted setting may correspond to measurements from sensor 230 and/or discrete positions settings for motor 210. Sensor 230 may provide more precise position information to controller 300 than that provided by the motor 210. For this reason, controller 300 may predict settings for an actuator assembly 200 based on measurements from sensor 230 and may operate motor 210 to locate output shaft 222 according to the predicted setting rather than directly driving motor 210 to a number of step corresponding to the predicted position.

In a slot die including a plurality of actuator assemblies, such as actuator assemblies 200, each actuator assembly including a measurement instrument, such as sensor 230, each measurement instrument is configured to provide a local measurement of the slot die, the local measurement corresponding to the cross-directional thickness of the fluid flow path at the location of the respective measurement instrument. When a controller, such as controller 200 positions each of the actuators, e.g., according to the set of discrete settings, the controller may monitor the local measurements from the measurement instruments. The controller may then, for each of the actuators, adjusting the relative position of the actuator until the actuator provides the absolute cross-directional thickness of the fluid flow path at the respective location of the actuator defined by the set of discrete settings.

Fluid dynamics, fluid properties of the extrudate, and a digital model of a die allows controller 300 to predict discrete setting for the actuators of slot die 10. In many applications, it is desirable to provide a consistent thickness of an extruded product across the entire width of the die. As another example for strip coating controller may predict discrete setting for the actuators of slot die 10 to predict a set of discrete settings from the plurality of discrete settings corresponding to a preselected strip width.

Modeling of an extrudate flowing through a die may incorporate many aspects of the die itself including applicator slot width, a distance from the manifold cavity to the exit of the applicator slot, and a slot thickness, which is the narrow dimension of the applicator slot between the two parallel surfaces defining the slot itself. One fundamental issue in attaining the uniformity of the flow, and critical uniformity of the coated product, is the ability to construct a die with the best possible uniformity of the die slot "thickness." The sensitivity is greater than linear, which means that variations in die slot thickness are magnified in extruded products.

Modeling the flow may use of any appropriate models characterizing fluid rheology. For example, modeling the flow may include finite element analysis or may more directly rely on one or more equations. As one example, for a power law fluid, the relationship between flow in the slot and the slot geometry is given by the equation:

$$\frac{Q}{W} = \frac{nB^2}{2(1+2n)}(BP/2KL)^{1/n}. \tag{Equation 1}$$

In Equation 1, Q/W is the flow per unit width, B is the slot height, P is pressure, L is the slot length (corresponding to the die width), n is the power law index and K is the coefficient for power law viscosity. A Newtonian constant viscosity fluid has n=1 and K is then the numerical viscosity.

As another example, slot uniformity can be characterized by the uniformity of the walls of the slot. If each slot has a Total Indicated Runout or TIR of 2t, then the percent uniformity of the flow from the slot is then:

$$\%=100((B+t)^{(2+1/n)}-(B-t)^{(2+1/n)})/B^{(2+1/n)} \tag{Equation 2}$$

For a constant viscosity (Newtonian) fluid, this means that the coating uniformity goes as the cube of the slot height (B). This relationship is shown as Equation 3.

$$\% \text{ Coat Uniformity}=100((B_{MAX})^3-(B_{MIN})^3)/B_{AVG}^3 \tag{Equation 3}$$

While Equation 3 may not be directly used to predict slot settings because Equation 3 may not account for all details including details related to the extrusion flows, materials, to the die design itself. However, Equation 3 demonstrates the importance for providing a precisely tuned thickness across the width of the die. In particular, Equation 3 demonstrates that any variations in the thickness of the fluid flow path are magnified in the resulting cross-web profile of the extruded product.

Equation 1 may, for example, be used to predict a die slot change because, according to the techniques disclosed herein, the position of the actuator, and by inference the die slot thickness B, is known in combination with the desired extrudate target thickness, the current measured extrudate thickness. Previously, knowing the absolute position of the die slot thickness during an extrusion process has not be possible, e.g., due to the backlash in differential bolts. Using the known target thickness and the measured extruded product thickness profile, Equation 1 can predict an appropriate die slot change. For example, as we know by inference the relationship between die slot thickness profile and extruded product thickness profile from the known die slot thickness profile and the measured extruded product thickness profile and can thus predict a slot thickness profile to obtain the target thickness profile.

Assuming that other elements of the flow path are of less importance, for a Newtonian fluid, the predicted slot thickness corresponding to actuator "i", $B'_i$ is calculated as shown in Equation 4.

$$B'_i = \left(\frac{t'_i}{t_i}\right)^{1/3} B_i \quad \text{(Equation 4)}$$

For a Power Law fluid, Equation 4 may be represented as Equation 5.

$$B'_i = B_i\left(\frac{t'_i}{t_i}\right)^{(1/2+\frac{1}{n})} \quad \text{(Equation 5)}$$

For purposes of illustration, the fluid mechanical predictions can include the geometric circumstances of the die. For a flexible die lip such as flexible die lip 32 in FIG. 3, the slot height may be better approximated by considering converging or diverging slots with a nominal fixed slot at the hinge point. Assuming the hinge point slot remains constant, then Equation 6 applies.

$$B(x) = B_{Hinge} + \frac{(B_{Lip} - B_{Hinge})}{L}x. \quad \text{(Equation 6)}$$

According to the fluid mechanics lubrication approximation:

$$\frac{Q}{W} = \frac{(P_{Lip} - P_{Hing})B_{Hinge}^2 B_{Lip}^2}{6\mu(B_{Hinge} + B_{Lip})} \quad \text{(Equation 7)}$$

This results in Equation 8. Equation 9 represents $c_i$ for Equation 8.

$$B'_{i,Lip} = \frac{C_i \pm \sqrt{C_i^2 + 4C_i B_{i,Hinge}^3}}{2B_{i,Hinge}^2} \quad \text{(Equation 8)}$$

$$C_i = \frac{B_{i,Hinge}^2 B_{i,Lip}^2}{(B_{i,Hinge} + B_{i,Lip})} \quad \text{(Equation 9)}$$

These closed form examples are useful, but it is clear that one may extend the model to include every conceived detail of the mechanical, thermal, and fluid dynamical process details. The better the predictive model, the more rapid the techniques disclosed herein will converge to the best operating condition for the desired extrudate profile.

Equations 1-9 are merely exemplary, and any number of equations may be used to predict the settings for actuator assemblies 200 in slot die 10 corresponding to a preselected cross-web profile. For example, predicting the optimal settings for actuator assemblies 200 in slot die 10 may include modeling heat transfer and thermal dissipation throughout slot die 10 and the extrudate. Such predictive modeling may include prediction of the mechanical deflections of the die assembly and mechanical elements due to thermal and flow induced forces. As previously mentioned, such models may rely upon finite element analysis, or may use more general equations to predict the settings for actuator assemblies 200 in slot die 10 corresponding to the preselected cross-web profile.

Once controller 300 predicts the settings for actuator assemblies 200 in slot die 10 corresponding to the preselected cross-web profile, slot die 10 is operated by passing an extrudate through the fluid flow path and out applicator slot 6 with the actuator assemblies 200 positioned according to the set of predicted settings (508).

During the operation of slot die 10, controller evaluates the cross-web profile of the extrudate after it exits the applicator slot according to measurements of the extruded product (510). For example, controller 300 may receive inputs from a sensor that directly measures thicknesses of the extruded product at multiple cross-web locations. As one example, a beta radiation thickness gauge may be used to measure the thicknesses of the extruded product during operation of a slot die. For strip coating, controller 300 may receive inputs from a sensor that directly measures strip width and/or thickness of individual strips. Using the evaluation of the cross-web profile, fluid dynamics and the digital model of the die, controller 300 then determines whether adjustments to the predicted set of discrete settings may provide a cross-web profile of the extrudate after it exits the applicator slot that more closely matches the preselected cross-web profile.

If controller 300 determines that adjustments to the predicted set of discrete settings may provide a cross-web profile of the extrudate after it exits the applicator slot that more closely matches the preselected cross-web profile, the controller predicts an improved set of discrete settings from the plurality of discrete settings corresponding to the preselected cross-web profile (512). While continuing to operate the slot die by passing the extrudate through the fluid flow path and out the applicator slot, controller 300 repositions the actuators according to the improved predicted set of discrete settings (514). Steps 510, 512 and 514 may be repeated until controller 300 determines that the predicted set of settings cannot be improved and/or at periodic intervals to maintain a desired cross-web profile. A set of discrete settings (514) can be saved as a recipe for future retrieval and use at a future time minutes, hours, or years later when similar materials, extrusion or coating properties, and processing conditions are required.

Figure 6:
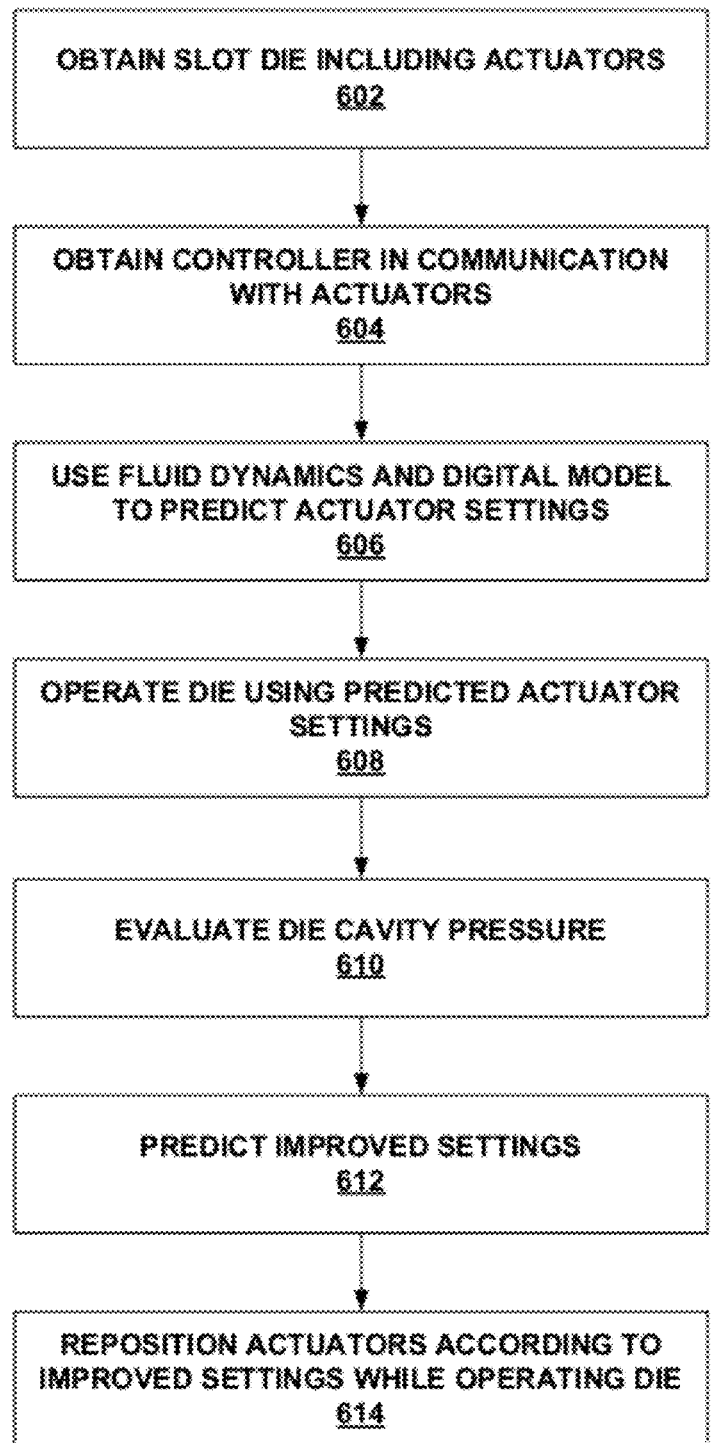
FIG. 6 is a flowchart illustrating techniques for selecting the position of each actuator in a plurality of actuators of a slot die according to a preselected die cavity pressure during operation of the die.

FIG. 6 is a flowchart illustrating techniques for selecting the position of each actuator in a plurality of actuators of a slot die according to a preselected die cavity pressure. While not limited to the slot dies disclosed herein, for clarity, the techniques of FIG. 6 are described with respect to slot die 10 (FIGS. 1A-1B), actuator assembly 200 (FIG. 4) and controller 300 (FIG. 4). In different examples, the techniques of FIG. 6 may be utilized for a film slot die, a multi-layer slot die, a hot melt extrusion coating die, a drop die, a rotary rod die, an adhesive slot die, a solvent coating slot die, a water-based coating die, a slot fed knife die or other slot die.

First, a slot die, such as slot die 10, is obtained (602). The slot die includes an applicator slot extending about a width of the slot die and a plurality of actuators spaced about the width of the slot die. The applicator slot is in fluid communication with a fluid flow path through the slot die. Each actuator in the plurality of actuators is operable to adjust a cross-directional thickness of the fluid flow path at its respective location to provide a local adjustment of fluid flow through the applicator slot.

Next, a controller, such as controller 300, in communication with each actuator is obtained (604). The controller is configured to set the position of each actuator according to one of a plurality of discrete settings, such as measured position of sensor 230 and/or a stepper motor setting for motor 210.

Using fluid dynamics and a digital model of die 10, such as a solid model of die 10, controller 300 predicts a set of discrete settings from the plurality of discrete settings corresponding to a preselected die cavity pressure (606). In different examples controller 300 may retrieve the preselected die cavity pressure from a non-transitory computer readable medium or may receive the preselected die cavity pressure from a user input.

In different examples, the predicted setting may correspond to measurements from sensor 230 and/or discrete positions settings for motor 210. Sensor 230 may provide more precise position information to controller 300 than that provided by the motor 210. For this reason, controller may predict settings for an actuator assembly 200 based on measurements from sensor 230 and may operate motor 210 to locate output shaft 222 according to the predict setting rather than directly driving motor 210 to a number of step corresponding to the predicted position.

Fluid dynamics, known fluid properties of the extrudate, and a digital model of a die allows controller 300 to predict discrete setting for the actuators of slot die 10. Modeling of an extrudate flowing through a die may incorporate many aspects of the die itself including applicator slot width, a distance from the manifold cavity to the exit of the applicator slot, and a slot thickness, which is the narrow dimension of the applicator slot between the two parallel surfaces defining the slot itself.

Any number of equations may be used to predict the settings for actuator assemblies 200 in slot die 10 corresponding to a preselected die cavity pressure. For example, predicting the optimal settings for actuator assemblies 200 in slot die 10 may include modeling heat transfer and thermal dissipation throughout slot die 10 and the extrudate. As previously mentioned, such models may rely upon finite element analysis, or may use more general equations to predict the settings for actuator assemblies 200 in slot die 10 corresponding to the preselected die cavity pressure.

Once controller 300 predicts the settings for actuator assemblies 200 in slot die 10 corresponding to the preselected die cavity pressure, slot die 10 is operated by passing an extrudate through the fluid flow path and out applicator slot 6 with the actuator assemblies 200 positioned according to the set of predicted settings (608).

During the operation of slot die 10, controller measures the die cavity pressure within die cavity 4 (610) or at a suitable measurement point in flow path, which may occur before or after fluid flow path entry 5. For example, controller 300 may receive inputs from a sensor that directly measures die cavity pressure within die cavity 4. Using the measured die cavity pressure, fluid dynamics and the digital model of the die, controller 300 then determines whether adjustments to the predicted set of discrete settings may provide a die cavity pressure that more closely matches the preselected die cavity pressure.

If controller 300 determines that adjustments to the predicted set of discrete settings may provide a die cavity pressure that more closely matches the preselected die cavity pressure, the controller predicts an improved set of discrete settings from the plurality of discrete settings corresponding to the preselected die cavity pressure (612). While continuing to operate the slot die by passing the extrudate through the fluid flow path and out the applicator slot, controller 300 repositions the actuators according to the improved predicted set of discrete settings (614). Steps 610, 612 and 614 may be repeated until controller 300 determines that the predicted set of settings cannot be improved and/or at periodic intervals to maintain a desired die cavity pressure.

In some examples, the techniques of FIG. 6 may be combined with the techniques of FIG. 5. For example, controller 300 may seek to provide a cross-web profile with a consistent thickness, while also maintaining a preselected die cavity pressure. In such examples, controller 300 may use the same fluid dynamics and a digital model of the die discussed with respect to FIG. 5 and FIG. 6 to determine settings for actuator assemblies 200 that will provide both a cross-web profile and a preselected die cavity pressure. In one example, the pressure control enables control of a die arranged to coat strips or precise width. Further, the pressure control can be accomplished where a sensor to detect strip width in communication with controller 300 is utilized to select the die pressure control. A set of discrete settings (514) can be saved as a recipe for future retrieval and use at a future time minutes, hours, or years later when similar materials, extrusion or coating properties, and processing conditions are required.

Figure 7:
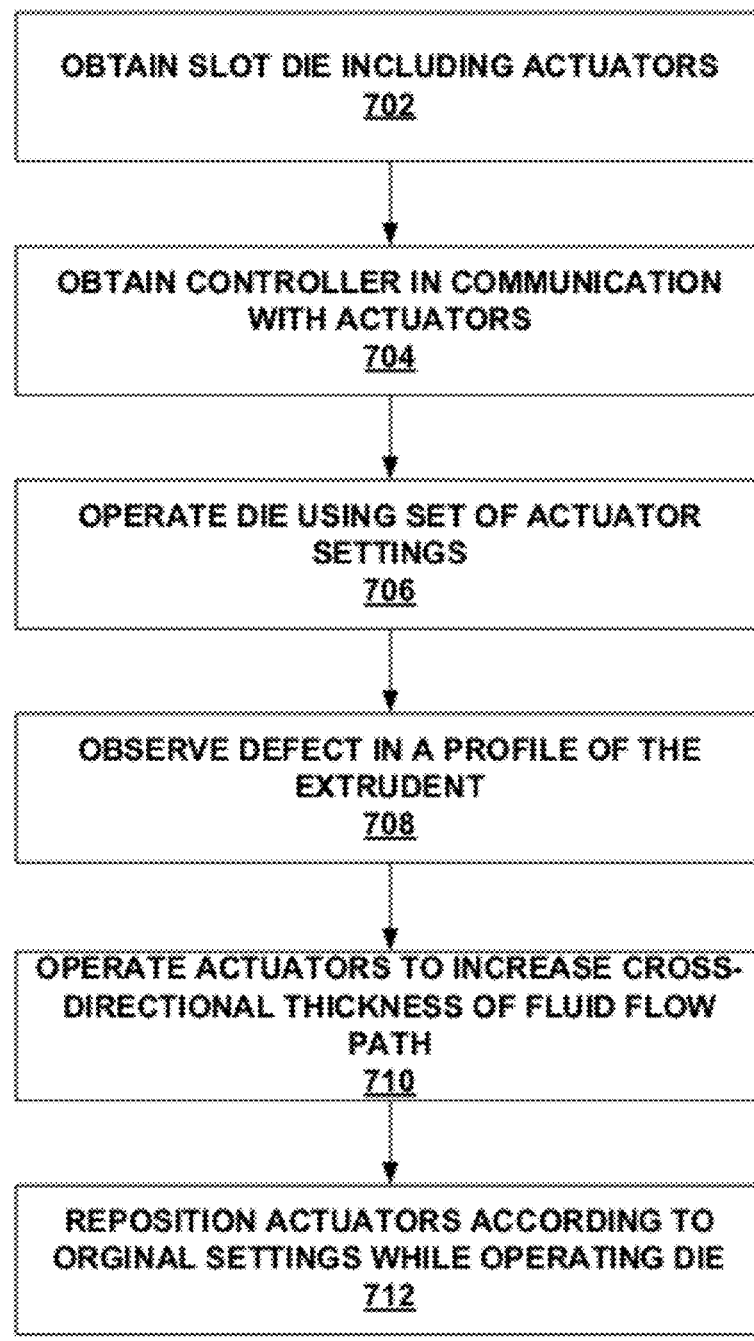
FIG. 7 is a flowchart illustrating techniques for clearing a slot die by increasing the cross-directional thickness of the fluid flow path adjacent each of the actuators while continuing to operate the die.

FIG. 7 is a flowchart illustrating techniques for clearing a slot die by increasing the cross-directional thickness of the fluid flow path adjacent each of the actuators while continuing to operate the die. While not limited to the slot dies disclosed herein, for clarity, the techniques of FIG. 7 are described with respect to slot die 10 (FIGS. 1A-1B), actuator assembly 200 (FIG. 4) and controller 300 (FIG. 4). In different examples, the techniques of FIG. 7 may be utilized for a film slot die, a multi-layer slot die, a hot melt extrusion coating die, a drop die, a rotary rod die, an adhesive slot die, a solvent coating slot die, a water-based coating die, a slot fed knife die or other slot die.

First, a slot die, such as slot die 10, is obtained (702). The slot die includes an applicator slot extending about a width of the slot die and a plurality of actuators spaced about the width of the slot die. The applicator slot is in fluid communication with a fluid flow path through the slot die. Each actuator in the plurality of actuators is operable to adjust a cross-directional thickness of the fluid flow path at its respective location to provide a local adjustment of fluid flow through the applicator slot.

Next, a controller, such as controller 300, in communication with each actuator is obtained (704). The controller is configured to set the position of each actuator according to one of a plurality of discrete settings, such as measured position of sensor 230 and/or a stepper motor setting for motor 210. Controller 300 then positions each of the actuators with the controller according to a set of discrete settings selected from the plurality of discrete settings (706), and slot die 10 is operated by passing an extrudate through the fluid flow path and out applicator slot 6 with the actuator assemblies 200 positioned according to the set of discrete settings (708).

Next, a defect in a profile of the extrudate after the extrudate flows out of the applicator slot is observed, e.g., either by controller 300 or by a user. As discussed in conjunction with Equation 3, any small disturbance to the flow in the die slot will result in a disruption to the flow of liquid emitted from the die slot, thus affecting the cross-web uniformity of the extruded product or coating. Often, such disturbances are associated with gels or particulates getting caught in the die slot itself. In coating, this flow blockage results in a streak, or if wider, a band in the coating. In film extrusion, this results in undesirable die lines. For this reason, it is desirable to allow the impurity to pass through the die.

In order to allow the impurity to pass through the die, once the defect in the profile of the extrudate after the extrudate flows out of the applicator slot is observed, controller 300 increases the cross-directional thickness of the fluid flow path adjacent each of the actuator assemblies 200 while continuing to pass the extrudate through the fluid flow path and out the applicator slot (710). For example, controller 300 may operate actuator assemblies 200 in unison or sequentially to increase the thickness of the fluid flow path through slot die 10.

After increasing the cross-directional thickness of the fluid flow path adjacent each of the actuators to allow the disturbance to clear the die, while continuing to pass the extrudate through the fluid flow path and out the applicator slot, controller repositions each of the actuators with the controller according to the original set of discrete settings, i.e., the most recent set of adjusted settings prior to the purge operation, to resume operating the slot die with the actuators positioned according to the original set of discrete settings (712). In some examples, the repositioning of the actuators according to the original set of discrete settings may occur within thirty minutes, such as less than fifteen minutes, less than five minutes, less than two minutes or even less than one minute, of increasing the cross-directional thickness of the fluid flow path adjacent the actuators.

Figure 8:
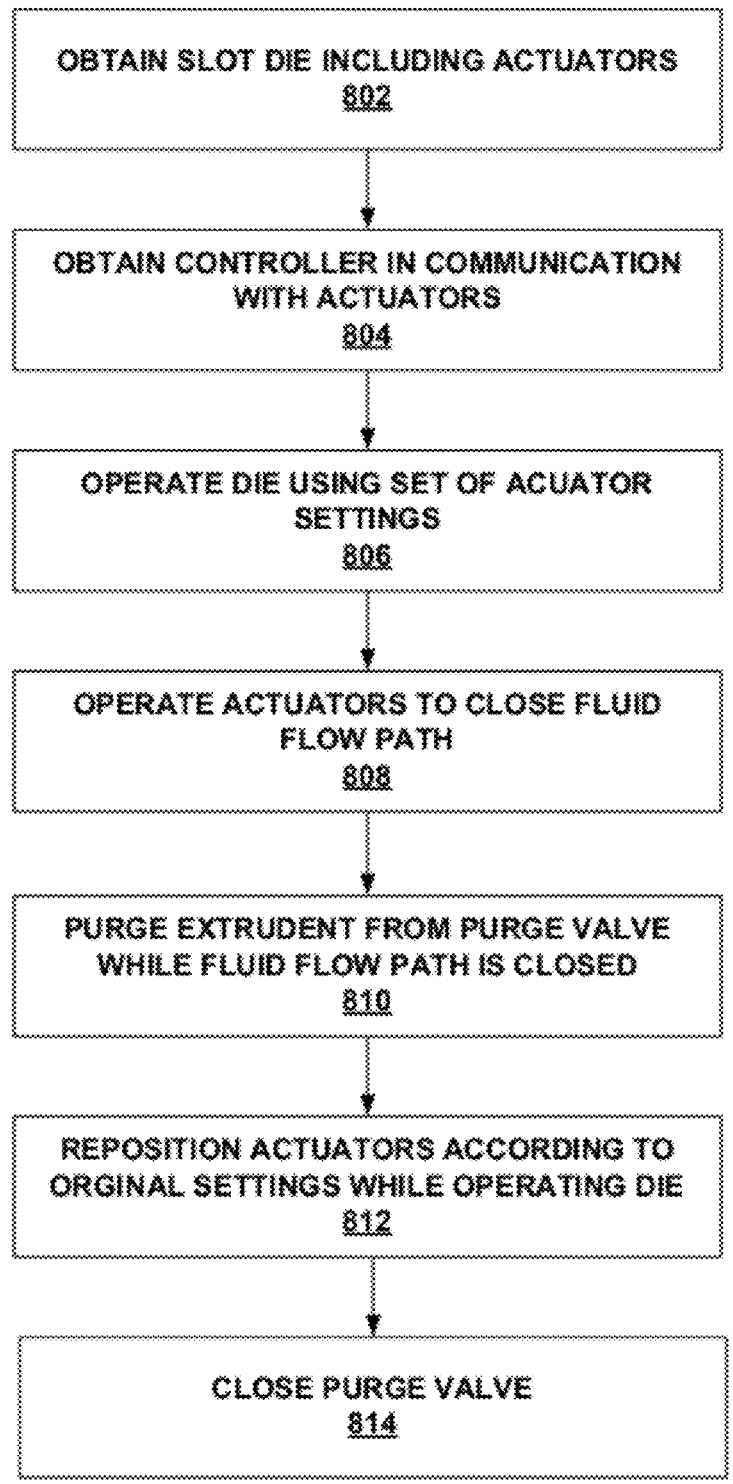
FIG. 8 is a flowchart illustrating techniques for purging a slot die by substantially closing fluid flow path adjacent each of the actuators while continuing to operate the die.

FIG. 8 is a flowchart illustrating techniques for purging a slot die by substantially closing the fluid flow path adjacent each of the actuators while continuing to operate the die. While not limited to the slot dies disclosed herein, for clarity, the techniques of FIG. 8 are described with respect to slot die 10 (FIGS. 1A-1B), actuator assembly 200 (FIG. 4) and controller 300 (FIG. 4). In different examples, the techniques of FIG. 8 may be utilized for a film slot die, a multi-layer slot die, a hot melt extrusion coating die, a drop die, a rotary rod die, an adhesive slot die, a solvent coating slot die, a water-based coating die, a slot fed knife die or other slot die.

First, a slot die, such as slot die 10, is obtained (802). The slot die includes an applicator slot extending about a width of the slot die and a plurality of actuators spaced about the width of the slot die. The applicator slot is in fluid communication with a fluid flow path through the slot die. Each actuator in the plurality of actuators is operable to adjust a cross-directional thickness of the fluid flow path at its respective location to provide a local adjustment of fluid flow through the applicator slot.

Next, a controller, such as controller 300, in communication with each actuator is obtained (804). The controller is configured to set the position of each actuator according to one of a plurality of discrete settings, such as measured position of sensor 230 and/or a stepper motor setting for motor 210. Controller 300 then positions positioning each of the actuators with the controller according to a set of discrete settings selected from the plurality of discrete settings, and slot die 10 is operated by passing an extrudate through the fluid flow path and out applicator slot 6 with the actuator assemblies 200 positioned according to the set of discrete settings (806).

Next, either a user or controller 300 decides to interrupt the extrusion process through slot die 10. Accordingly, controller 300 substantially closes the fluid flow path adjacent each of the actuator assemblies 200 (808). For example, controller 300 may operate actuator assemblies 200 in unison or sequentially to substantially the fluid flow path through slot die 10.

Actually stopping flow of the extrudate through slot die 10 may be undesirable; e.g., it may take significant time on start-up to each equilibrium temperatures of slot die 10 and the extrudate. In addition, for a heated extrudate, stopping the flow may be undesirable due to thermal degradation of the stagnant material in the flow system. For this reason, a slot die, such as slot die 10, may include a purge valve (not shown in the figures). The extrudate may continue to flow through the slot die once by purging the extrudate from the purge valve while the fluid flow path is substantially closed (810). For example, the purge valve may operate as a pressure relief valve and may open automatically once controller 300 substantially closes the fluid flow path adjacent each of the actuator assemblies 200 due to increased pressure within die cavity 4. In other examples, the purge valve may be actively opened, either by controller 300 or an operator.

After substantially closing the fluid flow path adjacent each of the actuator assemblies 200, while continuing to purging the extrudate from the purge valve, once ready to resume operations, controller 300 repositions each of the actuators according to the original set of discrete settings (812). In addition, the purge valve is closed, either automatically or manually to resume operation of the slot die (814). In some examples, the repositioning of the actuators according to the original set of discrete settings to resume operating the slot die with the actuators positioned according to the set of discrete settings may occur within thirty minutes, such as less than fifteen minutes, less than five minutes, less than two minutes or even less than one minute, of substantially closing the fluid flow path.

Figure 9:
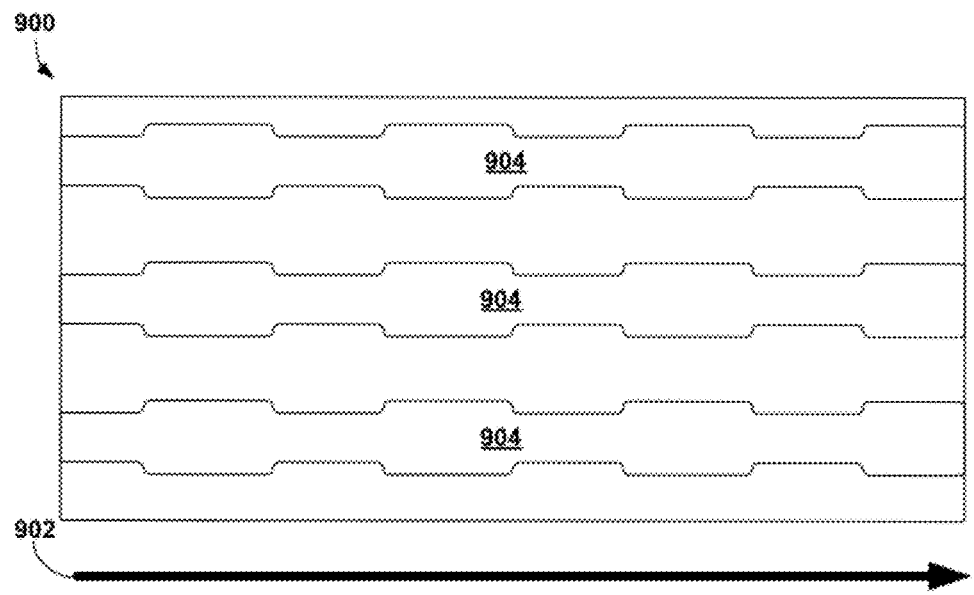
FIG. 9 illustrates a strip coating including a pattern created by repeatedly adjusting actuator position settings in a slot die.

FIG. 9 illustrates a strip coating 900, which includes strips 904 that form a strip pattern created by repeatedly adjusting actuator position settings in a slot die. Strips 904 were extruded simultaneously from a single die, such as slot die 10 along direction 902. In particular, strip coating 900 provides strips 904 having varying widths.

A slot die, such as slot die 10 may be operated to produce strips 904 by positioning each of the actuators with the controller according to a first set of discrete settings selected from the plurality of discrete settings and by passing an extrudate through the fluid flow path and out the applicator slot with the actuators positioned according to the first set of discrete settings. Then, while passing the extrudate through the fluid flow path and out the applicator slot, controller 300 may change the positions of the actuators with the controller to create strips having varying widths.

For example, controller 300 may cycle between a series of sets of discrete settings including the first set of discrete settings such that the varying widths of strips 904 provide a substantially repeating pattern, such as that shown in FIG. 9. Controller 300 may continue to change the position of the actuators while passing the extrudate through the fluid flow path and out the applicator slot to create varying widths in the extrudate for a period in excess of ten minutes, such as a period in excess of thirty minutes, a period in excess of one hour, a period in excess of three hours or even a period in excess of twelve hours.

Figure 10:
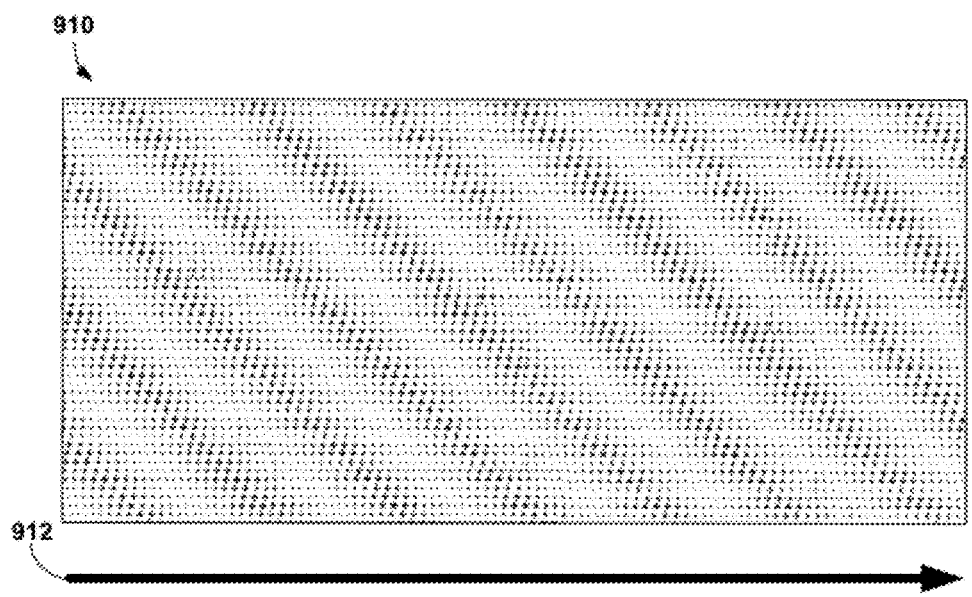
FIG. 10 illustrates an extruded product including a pattern created by repeatedly adjusting actuator position settings in a slot die.

FIG. 10 illustrates extruded product 910 including a pattern created by repeatedly adjusting actuator position settings in a slot die. Extruded product 910 was extruded from a die, such as slot die 10 along direction 912. As shown in FIG. 10, lighter sections represent relatively thicker portions of the patterned product and darker sections represent relatively thinner portions of the patterned product. In particular, extruded product 910 includes a series of ridges that extend at an angle across a width of product 910.

A slot die, such as slot die 10, may be operated to produce extruded product 910 by positioning each of the actuators with the controller according to a first set of discrete settings selected from the plurality of discrete settings and by passing an extrudate through the fluid flow path and out the applicator slot with the actuators positioned according to the first set of discrete settings. Then, while passing the extrudate through the fluid flow path and out the applicator slot, controller 300 may change the positions of the actuators with the controller to create patterned features in the extrudate.

In some examples, controller 300 may selects randomized settings from the plurality of discrete settings such that the patterned features in the extrudate are randomized pattern features. The randomized settings selected by the controller conform to preselected specifications for the randomized pattern features, for example, such preselected specifications may represent an average extruded product thickness, a standard deviation of product thickness or other product profile specification.

In other examples, controller 300 may cycle between a series of sets of discrete settings including the first set of discrete settings such that the patterned features in the extrudate are a substantially repeating pattern, such as that shown in FIG. 10. Controller 300 may continue to change the position of the actuators while passing the extrudate through the fluid flow path and out the applicator slot to create patterned features in the extrudate for a period in excess of ten minutes, such as a period in excess of thirty minutes, a period in excess of one hour, a period in excess of three hours or even a period in excess of twelve hours.

Controller 300 may retrieve the first set of discrete settings and preselected specifications for the pattern features from a non-transitory computer readable medium. In other examples, controller 300 may receive the first set of discrete settings and preselected specifications for the pattern features from a user input.

Figure 11A:
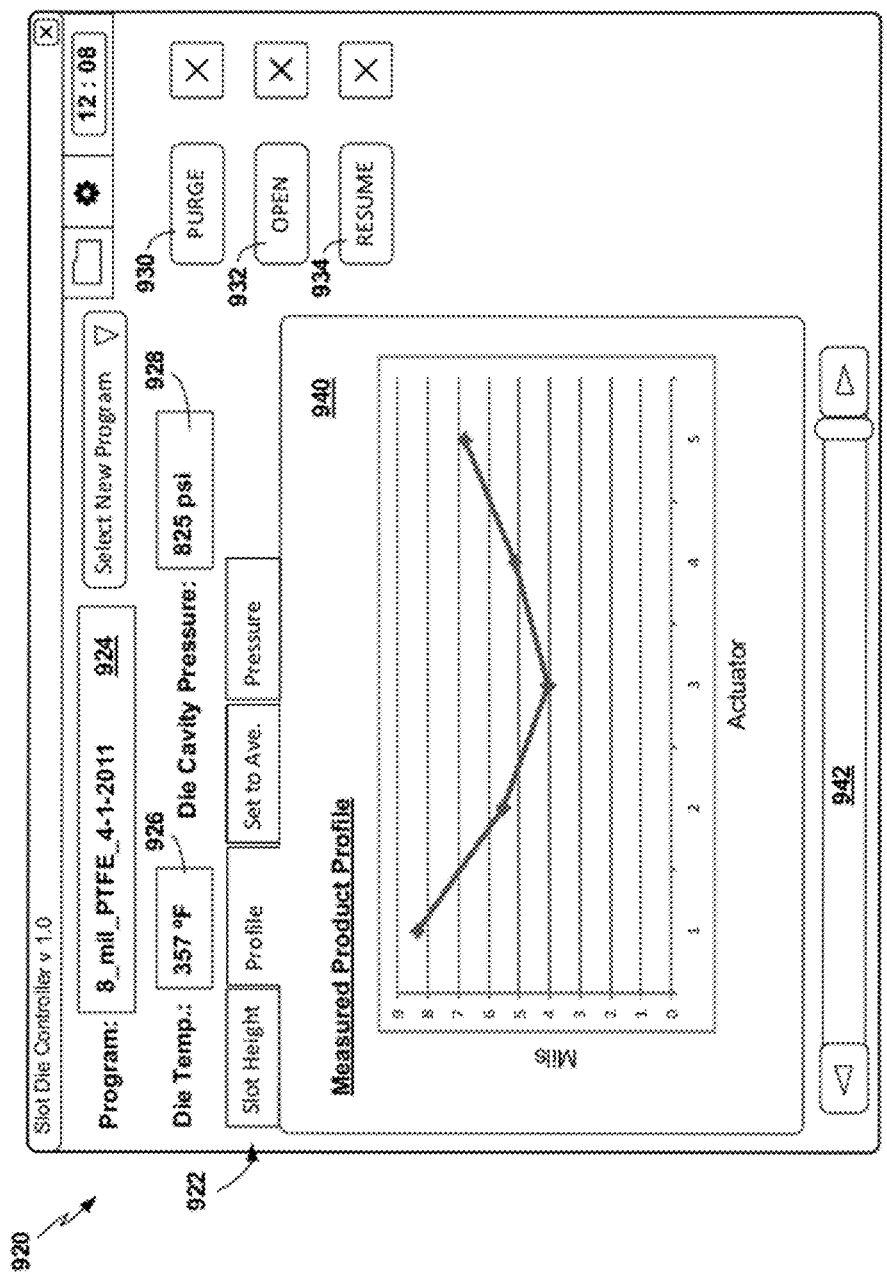
FIGS. 11A-11D illustrate an example user interface for a slot die controller.

FIGS. 11A-11D illustrate an example user interface 920 for a slot die controller. User interface 920 may interact with controller 300 to control operations of a set of actuator assemblies to control the operation of a slot die. As indicated in FIG. 11A, user interface 920 includes indications of a selected slot die operation program 924, die temperature 926 and die pressure 928. User interface 920 also include a set of selectable buttons that control operations of the die as well as corresponding cancel button, which allow a user to cancel the selection of one of the selectable buttons in the even that a selectable button was inadvertently activated. Selectable button 930 is configured to initiate a purge operation, such as the techniques disclosed herein with respect to FIG. 8. Selectable button 932 is configured to initiate a slot-clearing operation, such as the techniques disclosed herein with respect to FIG. 7. Selectable button 934 is configured to resume operation of the slot die according to the previous settings after a purge operation or a slot-clearing operation.

FIG. 11A also illustrates profile tab 940. Selection of profile tab 940 displays a graph including an indication of an extrudate product profile measured across a width of the extrudate product. The chart also displays an actuator number relative to the width of the extrudate product. In addition, profile tab 940 includes a scroll bar 942, which may be used to view the extrudate product profile at different times. However, as shown in FIG. 11A, scroll bar 942 is in the most forward position, such that profile tab 940 displays the current extrudate product profile and not a historical record of the extrudate product profile.

Figure 11B:
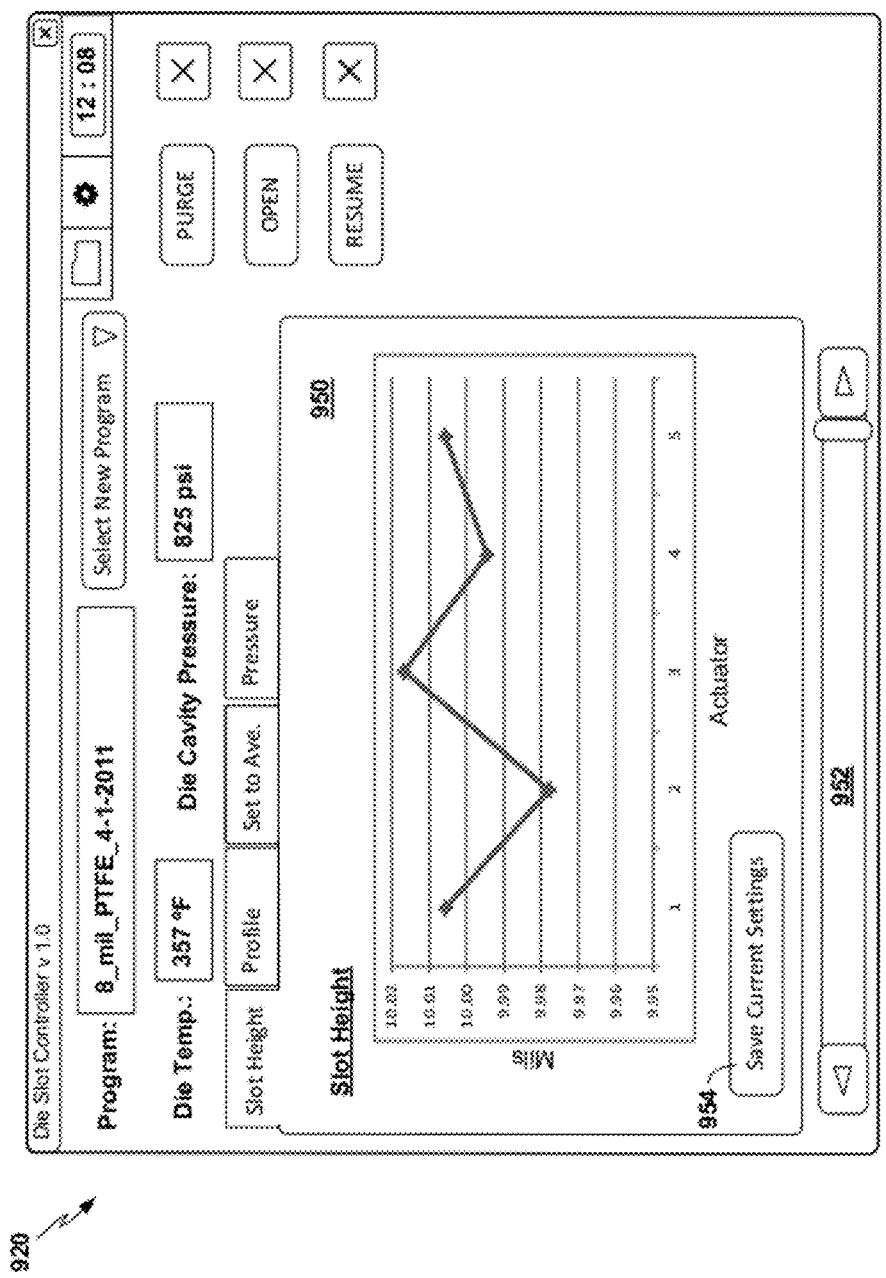

FIG. 11B illustrates slot height tab 950. Selection of slot height tab 950 displays a graph including an indication of slot height across a width of the die. The chart also displays an actuator number relative to the width of the slot height. In addition, slot height tab 950 includes a scroll bar 952, which may be used to view the slot height at different times. However, as shown in FIG. 11B, scroll bar 952 is in the most forward position, such that slot height tab 950 displays the current extrudate product profile and not a historical record of the extrudate product profile. Slot height tab 950 further includes selectable button, which may be used to save the current actuator settings for later retrieval.

Figure 11C:
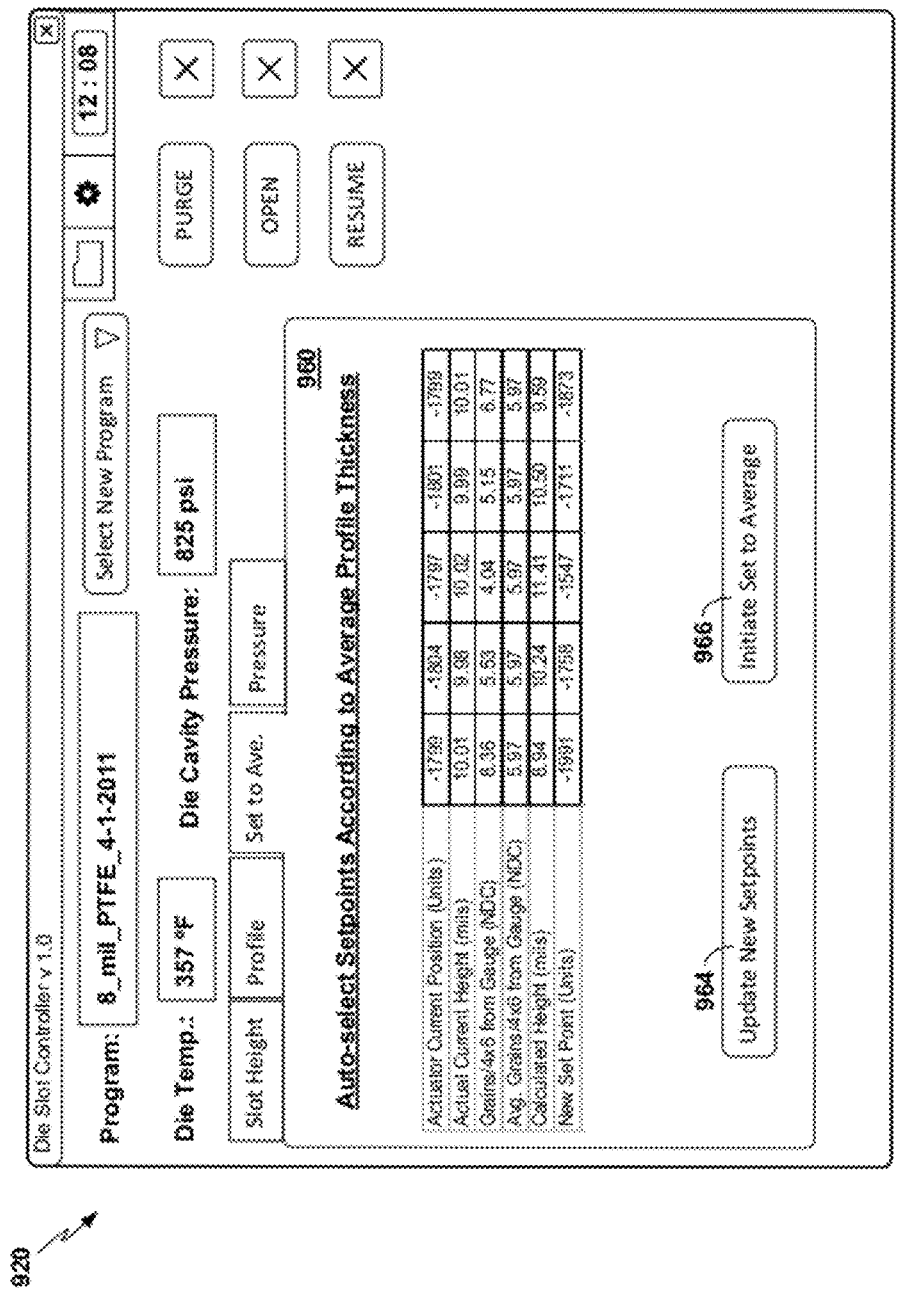

FIG. 11C illustrates auto-select average setpoint tab 960. Selection of auto-select average setpoint tab 960 displays a chart including the actuator position associated with each actuator of the slot die, the actual current height of the die slot corresponding to each actuator position, and the measured extrudate thickness by weight and height. In addition, auto-select average setpoint tab 960 includes a selectable update setpoint button 964. Selection of selectable update setpoint button 964 causes the controller to calculate new setpoints that will limit variability in the product profile. The new setpoints are then displayed in the chart of auto-select average setpoint tab 960. Selectable button 966 allows a user to then change the position of the actuators according to the calculated new setpoints.

Figure 11D:
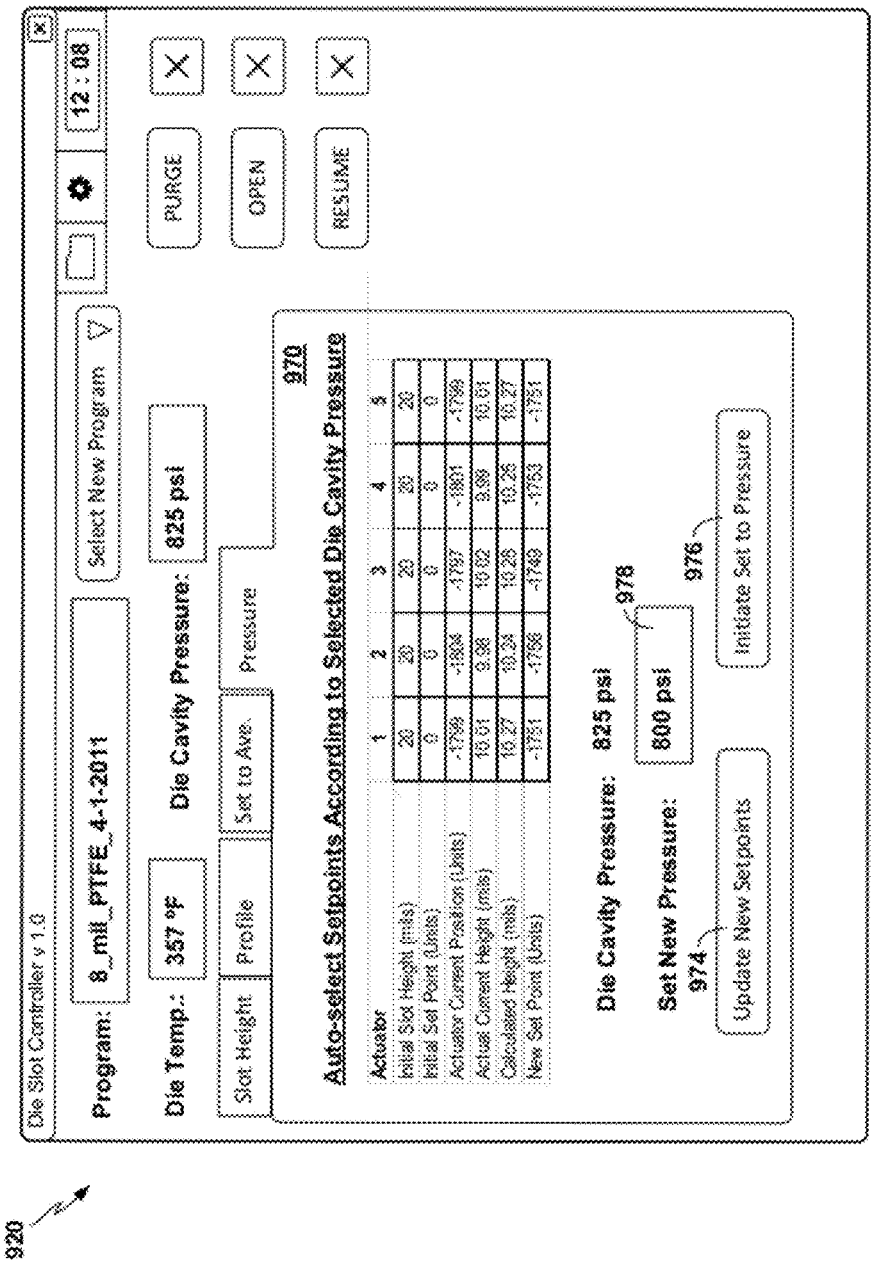

FIG. 11D illustrates auto-select pressure tab 970. Selection of auto-select pressure tab 970 displays a chart including the actuator position associated with each actuator of the slot die, the actual current height of the die slot corresponding to each actuator position, and the measured extrudate thickness by weight and height. In addition, auto-select pressure tab 970 includes a selectable update setpoint button 974. Selection of selectable update setpoint button 974 causes the controller to calculate new setpoints according to the pressure indicated in the "set new pressure" box 978. The new setpoints are then displayed in the chart of auto-select pressure tab 970. Selectable button 976 allows a user to then change the position of the actuators according to the calculated new setpoints.

Figure 12:
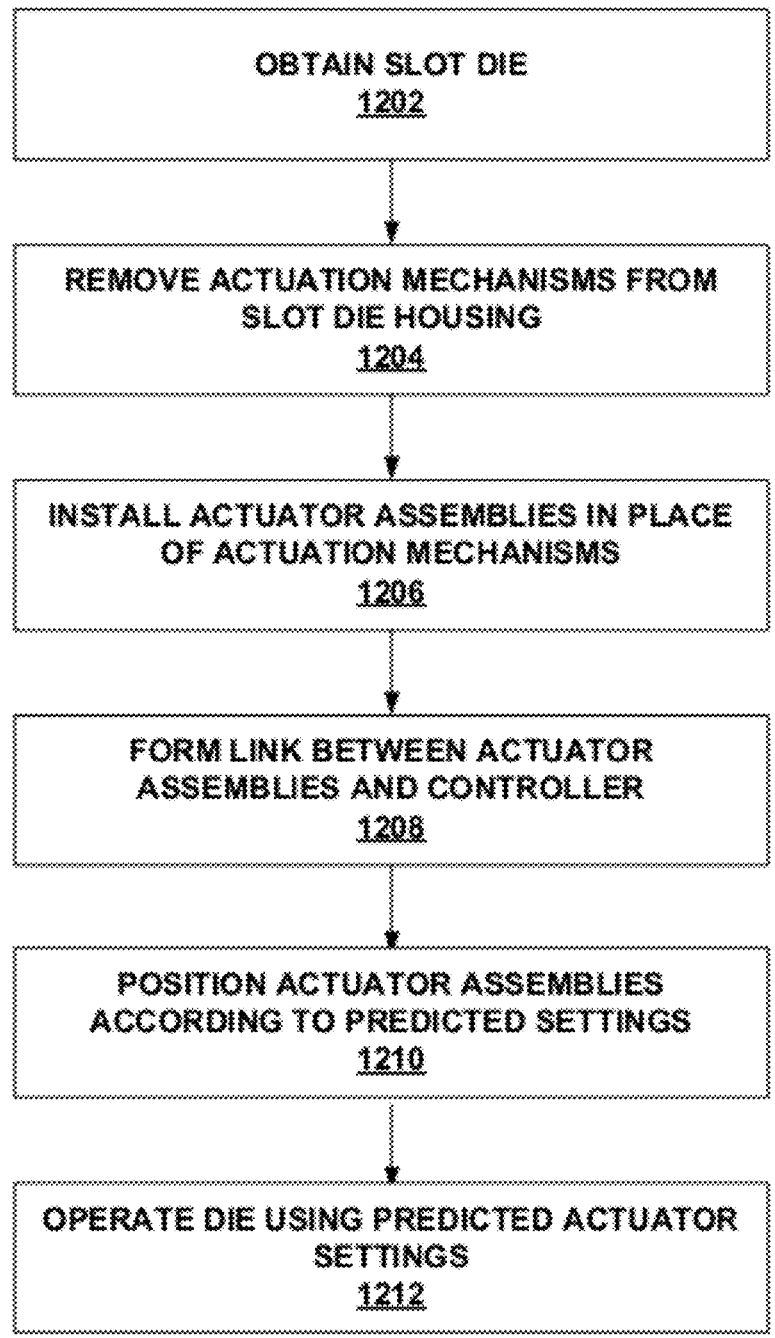
FIG. 12 illustrates techniques retrofitting a slot die with a set of actuator assemblies.

FIG. 12 illustrates techniques for retrofitting a slot die with actuator assemblies, such as a set of actuator assemblies 200 (FIG. 4). In different examples, the techniques of FIG. 12 may be utilized for a film slot die, a multi-layer slot die, a hot melt extrusion coating die, a drop die, a rotary rod die, an adhesive slot die, a solvent coating slot die, a water-based coating die, a slot fed knife die or other slot die.

First, a slot die is obtained (1202). The slot die includes an applicator slot extending about a width of the slot die and a plurality of actuation mechanisms spaced about the width of the slot die. The applicator slot is in fluid communication with a fluid flow path through the slot die. Each actuator in the plurality of actuation mechanisms is operable to adjust a cross-directional thickness of the fluid flow path at its respective location to provide an adjustment of fluid flow through the applicator slot. The slot die may be operated using the plurality of actuation mechanisms to control a thickness of a fluid flow path across a width of the slot die.

In different examples, the actuation mechanisms include one or more of the following: thermally-adjustable bolts, differential bolts, piezo-electric actuators, pneumatic actuators; and/or hydraulic actuators. In one example, the actuation mechanisms include thermally-adjustable bolts and the technique for retrofitting a slot die with thermally-adjustable bolts may include evaluating the cross-web profile of the extrudate after it exits the applicator slot and adjusting the relative position of one or more of the actuation mechanisms with its respective thermally-adjustable bolt such that the cross-web profile of the extrudate after it exits the applicator slot more closely conforms to a preselected cross-web profile.

Next, the actuation mechanisms are removed from the die housing (1204). A plurality of actuator assemblies, such as actuator assemblies 200, are installed in place of the actuation mechanisms (1206). Each actuator assembly in the plurality of actuator assemblies is operable to adjust a cross-directional thickness of the fluid flow path at its respective location to provide a local adjustment of fluid flow through the applicator slot.

Next, a controller, such as controller 300, is obtained and a communication link is formed between each actuator assembly and the controller (1208). The controller is configured to set the position of each actuator assembly according to one of a plurality of discrete settings, such as measured position of sensor 230 and/or a stepper motor setting for motor 210.

Using fluid dynamics and a digital model of the slot die, controller 300 predicts a set of discrete settings from the plurality of discrete settings corresponding to a preselected die cavity pressure. In different examples, controller 300 may retrieve the preselected die cavity pressure from a non-transitory computer readable medium or may receive the preselected die cavity pressure from a user input.

In different examples, the predicted setting may correspond to measurements from sensor 230 and/or discrete position settings for motor 210. Sensor 230 may provide more precise position information to controller 300 than that provided by the motor 210. For this reason, controller may predict settings for an actuator assembly 200 based on measurements from sensor 230 and may operate motor 210 to locate output shaft 222 according to the predicted setting rather than directly driving motor 210 to a number of step corresponding to the predicted position.

Fluid dynamics, known fluid properties of the extrudate, and a digital model of a die allows controller 300 to predict discrete settings for the actuator assemblies. Modeling of an extrudate flowing through a die may incorporate many aspects of the die itself including applicator slot width, a distance from the manifold cavity to the exit of the applicator slot, and a slot thickness, which is the narrow dimension of the applicator slot between the two parallel surfaces defining the slot itself.

Any number of equations may be used to predict the settings for the actuator assemblies, and the predicted settings may correspond to, e.g., a preselected cross-web profile and/ or a preselected die cavity pressure. For example, predicting settings for the actuator assemblies may include modeling heat transfer and thermal dissipation throughout the slot and the extrudate.

Once controller 300 predicts the settings for actuator assemblies 200 in slot die 10 corresponding to the preselected die cavity pressure, the slot die is operated by passing an extrudate through the fluid flow path and out the applicator slot with the actuator assemblies positioned according to the set of predicted settings (1212).

The techniques described in this disclosure, such as techniques described with respect to controller 300, may be implemented, at least in part, in hardware, software, firmware or any combination thereof. For example, various examples of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components, embodied in controllers, user interfaces or other devices. The term "controller" may generally refer to any of the foregoing logic circuitry, alone or in combination with other logic circuitry, or any other equivalent circuitry.

When implemented in software, the functionality ascribed to the systems and controllers described in this disclosure may be embodied as instructions on a computer-readable storage medium such as random access memory (RAM), read-only memory (ROM), non-volatile random access memory (NVRAM), electrically erasable programmable read-only memory (EEPROM), FLASH memory, magnetic media, optical media, or the like. The instructions may be executed to cause one or more processors to support one or more examples of the functionality described in this disclosure.

Various examples have been described. These and other examples are within the scope of the following claims.

The invention claimed is:

1. A method of controlling a slot die, the slot die including:
an applicator slot extending about a width of the slot die, wherein the applicator slot is in fluid communication with a fluid flow path through the slot die, and
a plurality of actuators spaced about the width of the slot die, wherein each actuator in the plurality of actuators is operable to adjust a cross-directional thickness of the fluid flow path at its respective location to provide a local adjustment of fluid flow through the applicator slot, the method comprising:
with a controller in communication with each actuator, wherein the controller is configured to set the position of each actuator according to one of a plurality of discrete settings, positioning each of the actuators according to a first set of discrete settings selected from the plurality of discrete settings;
operating the slot die by passing an extrudate through the fluid flow path and out the applicator slot with the actuators positioned according to the first set of discrete settings; and
while continuing to pass the extrudate through the fluid flow path and out the applicator slot, changing the positions of the actuators with the controller to create patterned features in the extrudate;
wherein each actuator in the plurality of actuators is operable to adjust a cross-directional thickness of the applicator slot at its respective location to provide the local adjustment of fluid flow through the applicator slot; and
wherein the slot die further includes any of:
a) a choker bar;
wherein the choker bar extends about a width of the slot die;
wherein the plurality of actuators are attached to the choker bar about a length of the choker bar, and
wherein each of the actuators is operable to control the thickness of the fluid flow path at its location by providing a local adjustment of the position of the choker bar within the fluid flow path; or
b) a rotary rod and a die lip that opposes the rotary rod, wherein the rotary rod extends about a width of the slot die;
wherein the applicator slot is between the rotary rod and the die lip, and
wherein the plurality of actuators is operable to control the cross-directional thickness of the applicator slot by moving the rotary rod relative to the die lip; or
c) a flexible die lip on one side of the applicator slot, wherein the flexible die lip extends about a width of the slot die; and
wherein the plurality of actuators is operable to control the cross-directional thickness of the applicator slot by moving the flexible die lip.

2. The method of claim 1,
wherein, when changing the positions of the actuators, the controller selects randomized settings from the plurality of discrete settings such that the patterned features in the extrudate are randomized pattern features, and
wherein the randomized settings selected by the controller conform to preselected specifications for the randomized pattern features.

3. The method of claim 1,
wherein, when changing the positions of the actuators, the controller cycles between a series of sets of discrete settings including the first set of discrete settings such that the patterned features in the extrudate are a substantially repeating pattern.

4. The method of claim 1, further comprising continuing to change the position of the actuators while passing the extrudate through the fluid flow path and out the applicator slot to create patterned features in the extrudate for a period in excess of ten minutes.

5. The method of claim 1, further comprising retrieving, with the controller, the first set of discrete settings and preselected specifications for the pattern features from a non-transitory computer readable medium.

6. The method of claim 1, further comprising receiving, with the controller, the first set of discrete settings and preselected specifications for the pattern features from a user input.

7. The method of claim 1, wherein the slot die further includes a plurality of measurement instruments, wherein each measurement instrument is configured to provide a local measurement of the slot die, the local measurement corresponding to the cross-directional thickness of the fluid flow path at the location of the respective measurement instrument,
wherein positioning each of the actuators with the controller according to the first set of discrete settings includes monitoring, with the controller, the local measurements from the measurement instruments in the plurality of measurement instruments and, for each of the actuators, adjusting the relative position of the actuator until the actuator provides the absolute cross-directional thickness of the fluid flow path at the respective location of the actuator defined by the first set of discrete settings.

8. A method of controlling a slot die, the slot die including:
an applicator slot extending about a width of the slot die, wherein the applicator slot is in fluid communication with a fluid flow path through the slot die, and
a plurality of actuators spaced about the width of the slot die, wherein each actuator in the plurality of actuators is operable to adjust a cross-directional thickness of the fluid flow path at its respective location to provide a local adjustment of fluid flow through the applicator slot, the method comprising:
with a controller in communication with each actuator, wherein the controller is configured to set the position of each actuator according to one of a plurality of discrete settings, positioning each of the actuators according to a first set of discrete settings selected from the plurality of discrete settings;
operating the slot die by passing an extrudate through the fluid flow path and out the applicator slot with the actuators positioned according to the first set of discrete settings to create a strip coating; and
while continuing to pass the extrudate through the fluid flow path and out the applicator slot, changing the positions of the actuators with the controller to adjust respective cross-directional thicknesses of the fluid flow path at its respective location to create strips having varying widths;
wherein each actuator in the plurality of actuators is operable to adjust a cross-directional thickness of the applicator slot at its respective location to provide the local adjustment of fluid flow through the applicator slot; and
wherein the slot die further includes any of:
a) a choker bar;
wherein the choker bar extends about a width of the slot die;
wherein the plurality of actuators are attached to the choker bar about a length of the choker bar, and
wherein each of the actuators is operable to control the thickness of the fluid flow path at its location by providing a local adjustment of the position of the choker bar within the fluid flow path; or
b) a rotary rod and a die lip that opposes the rotary rod, wherein the rotary rod extends about a width of the slot die;
wherein the applicator slot is between the rotary rod and the die lip, and
wherein the plurality of actuators is operable to control the cross-directional thickness of the applicator slot by moving the rotary rod relative to the die lip; or
c) a flexible die lip on one side of the applicator slot, wherein the flexible die lip extends about a width of the slot die; and
wherein the plurality of actuators is operable to control the cross-directional thickness of the applicator slot by moving the flexible die lip.

9. The method of claim 8,
wherein, when changing the positions of the actuators, the controller cycles between a series of sets of discrete settings including the first set of discrete settings such that the varying widths provide a substantially repeating pattern.

10. The method of claim 8 further comprising continuing to change the position of the actuators with the controller while passing the extrudate through the fluid flow path and out the applicator slot to create strips having varying widths for a period in excess of ten minutes.

11. The method of claim 8,
wherein the slot die further includes a plurality of measurement instruments, wherein each measurement instrument is configured to provide a local measurement of the slot die, the local measurement corresponding to the cross-directional thickness of the fluid flow path at the location of the respective measurement instrument,
wherein positioning each of the actuators with the controller according to the first set of discrete settings includes monitoring, with the controller, the local measurements from the measurement instruments in the plurality of measurement instruments and, for each of the actuators, adjusting the relative position of the actuator until the actuator provides the absolute cross-directional thickness of the fluid flow path at the respective location of the actuator defined by the first set of discrete settings.

12. The method of claim 1, wherein changing the positions of the actuators while continuing to pass the extrudate allows the cross-directional thickness of the fluid flow path at its respective location to be directly adjusted to create the extrudate having varying thickness along a length direction of the extrudate.

13. The method of claim 8, wherein the cross-directional thickness of the fluid flow path at its respective location is directly adjusted while continuing to pass the extrudate to create the strips having varying widths along a length direction of the extrudate.

* * * * *